US012632323B2

(12) United States Patent
Lu et al.

(10) Patent No.: US 12,632,323 B2
(45) Date of Patent: May 19, 2026

(54) CLOUD-NATIVE APPLICATION PROGRAMMING INTERFACE (API) RECOMMENDATION METHOD FUSING DATA AUGMENTATION AND CONTRASTIVE LEARNING

(71) Applicant: China Jiliang University, Zhejiang (CN)

(72) Inventors: Jiawei Lu, Zhejiang (CN); Gang Xiao, Zhejiang (CN); Qibing Wang, Zhejiang (CN); jiahong Zheng, Zhejiang (CN); Dongjin Yu, Zhejiang (CN); Xudong Zhang, Zhejiang (CN); Zhenbo Chen, Zhejiang (CN); Jun Xu, Zhejiang (CN); Duanni Li, Zhejiang (CN); Cece Wang, Zhejiang (CN)

(73) Assignee: China Jiliang University, Zhejiang (CN)

( * ) Notice: Subject to any disclaimer, the term of this patent is extended or adjusted under 35 U.S.C. 154(b) by 505 days.

(21) Appl. No.: 18/461,528

(22) Filed: Sep. 6, 2023

(65) Prior Publication Data

US 2025/0013514 A1 Jan. 9, 2025

(30) Foreign Application Priority Data

Jul. 5, 2023 (CN) .......................... 202310822440.4

(51) Int. Cl.
| | |
|---|---|
| *G06F 16/9536* | (2019.01) |
| *G06F 9/54* | (2006.01) |
| *G06F 17/16* | (2006.01) |

(52) U.S. Cl.
CPC .............. *G06F 9/547* (2013.01); *G06F 17/16* (2013.01)

(58) Field of Classification Search
CPC ................................. G06F 9/547; G06F 17/16
USPC ......................................................... 719/328
See application file for complete search history.

(56) References Cited

U.S. PATENT DOCUMENTS

| | | | |
|---|---|---|---|
| 12,536,437 B2 * | 1/2026 | Fathony ................. | G06N 3/045 |
| 2009/0235285 A1 * | 9/2009 | Kim .................... | G06F 16/9027 |
| | | | 719/328 |
| 2015/0363492 A1 * | 12/2015 | Laredo .................. | G06F 16/951 |
| | | | 707/770 |

(Continued)

*Primary Examiner* — Hiren P Patel
*Assistant Examiner* — Ross Michael Vincent
(74) *Attorney, Agent, or Firm* — JCIPRNET

(57) ABSTRACT

Disclosed is a cloud-native application programming interface (API) recommendation method fusing data augmentation and contrastive learning. Service information is included on the basis of a service information double-graph structure, and a mutual attention mechanism is designed to compute an importance degree of each layer of information. A data optimization method for sequence information based on functional similarity and a computation method for similarity between services based on two parts of information are provided; on this basis, data of a service invocation sequence is augmented with the idea of contrastive learning to form an augmented sequence pair; a computational contrastive loss function is combined with a pair-wise recommendation loss function to optimize an overall model, thereby improving the effect of a service recommendation model; and according to a feature embedding representation result of a service, pair-wise recommendation scores are computed to complete service recommendation.

10 Claims, 3 Drawing Sheets

(56) References Cited

U.S. PATENT DOCUMENTS

| | | | |
|---|---|---|---|
| 2018/0081961 A1* | 3/2018 | Nachlieli | G06F 5/01 |
| 2023/0251858 A1* | 8/2023 | Mauch | G06F 8/74 |
| | | | 717/136 |
| 2024/0211596 A1* | 6/2024 | Livne | G06F 21/563 |

* cited by examiner

CLOUD-NATIVE APPLICATION PROGRAMMING INTERFACE (API) RECOMMENDATION METHOD FUSING DATA AUGMENTATION AND CONTRASTIVE LEARNING

CROSS-REFERENCE TO RELATED APPLICATION

This application claims the priority benefit of China application serial no. 202310822440.4, filed on Jul. 5, 2023. The entirety of the above-mentioned patent application is hereby incorporated by reference herein and made a part of this specification.

TECHNICAL FIELD

The present invention belongs to the technical field of application programming interface (API) recommendation, and relates to a cloud-native API recommendation method fusing data augmentation and contrastive learning.

BACKGROUND

In a current era of cloud native, a number of companies have tacitly approved enterprise cloud. Emergence of a cloud native concept has promoted an enterprise to eliminate the need to build an infrastructure. How to make an adaption based on a cloud component, and how to reasonably use elasticity and functions of computation, storage, separation, etc. of the cloud have also become crucial. It is necessary to digitally transform a traditional manufacturer, which faces a business to be networked. In order to solve problems such as high concurrency and high throughput, it is inevitable to use an Internet architecture. An increasing number of enterprises are choosing to provide a service-based application. Software serving as a leading, i.e. a software-as-a-service (SaaS) mode, and a service serving as a core of a business provide computing and data resources for a developer, and provide a mature cloud software solution for the enterprise. With an open service platform, the developer can rapidly satisfy complex requirements of a user by combining reusable and replaceable third-party services. A mashup service is a typical service composition mode that generates a new application programming interface (API) by rapidly combining existing Web APIs, and is favored by the developer and has been rapidly developed with high efficiency and convenient use.

At present, the Web API is mainly built with a representational state transfer (RESTful) service technology. With complexity of business requirements of the application, it is difficult for a single RESTful service to satisfy requirements of the user. In view of this, a mashup service technology called as mashup has been proposed. The mashup service is mostly formed by a combination of the APIs, and has a core to reorganize a single API or different data sources. An increasing number of enterprises are choosing to provide the service-based application. It is crucial to choose the appropriate API to build a combined service. Rapid growth in the number of existing candidate APIs and a large number of services having similar functions have further increased the difficulty for the user to choose the appropriate API. With these challenges, a service recommendation technology has emerged.

Many solutions have been proposed to solve a service recommendation method. A graph neural network (GNN) propagates information through a graph structure. Great attention has been paid the GNN as an effective transformation learning method, which is widely used in tasks for processing non-Euclidean data, such as drug recognition, text classification and temporal recommendation. In a collaborative filtering based recommendation method, the GNN can use a graph structure formed by calling information as input such that adjacent nodes can affect each other, thereby improving learning capability for information. For service recommendation, an invocation relation between the mashup and the API can be represented as a binary graph structure. Moreover, additional information such as a tag can also be naturally represented as a graph association structure, and is suitable for being processed as a non-Euclidean data task.

Contrastive learning is a typical discriminative self-supervised learning method that learns a representation by comparing data. Original data is augmented to form new data, and the newly generated data is compared, such that comparison results between data pairs obtained by augmentation of the same data are minimized, and comparison results between data pairs obtained by augmentation of different data are maximized, so as to learn differences between different data without a tag.

SUMMARY OF THE DISCLOSURE

In order to overcome the defects of the prior art, better utilize service included information and improve the effect of a service recommendation system, the present invention provides a cloud-native application programming interface (API) recommendation method fusing data augmentation and contrastive learning. Service information is included on the basis of a service information double-graph structure, and a mutual attention mechanism is designed to compute an importance degree of each layer of information. A data optimization method for sequence information based on functional similarity and a computation method for similarity between services based on two parts of information are provided. On this basis, data of a service invocation sequence is augmented with the idea of contrastive learning to form an augmented sequence pair. A computational contrastive loss function is combined with a pair-wise recommendation loss function to optimize an overall model, thereby improving the effect of a service recommendation model. According to a feature embedding representation result of a service, pair-wise recommendation scores are computed to complete service recommendation.

The technical solution used by the present invention is as follows:

a cloud-native API recommendation method fusing data augmentation and contrastive learning. The method includes:

step 1, on the basis of service invocation matrix information and function association information between APIs, constructing an invocation graph structure, service invocation matrix graph (SIMG), between mashup services and API services and an invocation graph structure, connecting API functional graph (CAFG), between the APIs to form a double-graph structure;

step 2, according to the graph structure SIMG, designing a multi-layer graph propagation network structure to learn mashup feature representations and API feature representations;

step 3, according to the graph structure CAFG, designing a corresponding graph neural network structure to compute feature representations corresponding to APIs under the graph neural network structure;

step 4, designing a mutual attention mechanism layer to retain multi-layer output information, and computing attention weights of multi-layer output and merging feature representations of the mashup services by taking association information of the APIs as importance guidance;

step 5, carrying out weighted combination on API feature representations of double graphs through a gate mechanism to generate a new API feature representation;

step 6, computing training similarity and prior information similarity between services, and generating data augmented sequence pairs through a data augmentation method;

step 7, computing pair-wise scores through the obtained feature representation, and computing an overall loss function result through the pair-wise scores and the data augmented sequence pairs to optimize parameters of an overall recommendation model; and step 8, matching a user request, sorting the pair-wise scores and completing service recommendation.

Further, step 1 includes:

1.1 representing mashup services in a mashup service set M as a mashup type of graph nodes, representing APIs in an API set A as an API type of graph nodes, and representing an overall graph node set as $V_{ma}$;

1.2 setting an empty set $\varepsilon_{ma}$ as a storage set of side information in the graph structure SIMG;

1.3 traversing the mashup services in M, setting a single mashup service traversed currently as m, and obtaining an API set $m_{invoke}$ invoked by the set M from an invocation interaction matrix MA between the mashups and the APIs, where the service invocation interaction matrix MA has a size of $|M|\times|A|$, where $|M|$ indicates the number of elements in the set M, and $|A|$ indicates the number of elements in the set A;

1.4 traversing the API set $m_{invoke}$ obtained in a previous step, setting the APIs traversed currently as $\alpha$, and with when a value corresponding to a corresponding position [m, $\alpha$] in the invocation interaction matrix MA is 1, which indicates that an invocation relation exists between m and $\alpha$, storing a side combination (m, $\alpha$) into $\varepsilon_{ma}$, which indicates that an undirected connection side exists between graph nodes corresponding to m and $\alpha$;

1.5 completing traversal, and combining a graph node set $V_{ma}$ and a side information set $\varepsilon_{ma}$ to complete construction of a graph structure SIMG ($V_{ma}$, $\varepsilon_{ma}$);

1.6 converting the API set A into a graph node set, which is represented as $V_\alpha$;

1.7 setting an empty set $\varepsilon_\alpha$ as a storage set of side information in the graph structure CAFG;

1.8 traversing the APIs in the set A, setting a single API traversed currently as $\alpha_1$, on this basis, traversing the APIs in A apart from $\alpha_1$, and setting a single API traversed currently as $\alpha_2$;

1.9 with a tag information set $A^{tag}$ of the APIs including tags corresponding to the APIs, setting a tag set corresponding to the APIs $\alpha_1$ as $$A_{a1}^{tag}$$

, setting a tag set corresponding to the APIs $\alpha_2$ as $$A_{a2}^{tag}$$

4

, and when $$A_{a1}^{tag}$$

$$\cap$$

$$A_{a2}^{tag}$$

is not an empty set, storing a side combination ($\alpha_1$, $\alpha_2$) into $\varepsilon_\alpha$, which indicates that an undirected connection side exists between graph nodes corresponding to $\alpha_1$ and $\alpha_2$; and 1.10 completing traversal, and combining the graph node set $V_\alpha$ and the side information set $\varepsilon_\alpha$ to complete construction of a graph structure CAFG($V_\alpha$, $\varepsilon_\alpha$).

Furthermore, step 2 includes:

2.1 constructing an embedding layer to store embedding vector information of the mashup services and API nodes in forms of:

$$E_{mashup} = \{e_{m_1}, e_{m_2}, \ldots, e_{m_{|M|}}\}$$

$$E_a = \{e_{a_1}, e_{a_2}, \ldots, e_{a_{|A|}}\}$$

$$E = \begin{bmatrix} E_{mashup} \\ E_a \end{bmatrix}$$

where $E_{mashup}$ indicates embedding representations corresponding to the mashup services, and $E_\alpha$ indicates embedding representations corresponding to the APIs; and combining $E_{mashup}$ and $E_\alpha$ to obtain an embedding layer embedding matrix E;

2.2 computing an adjacency matrix of the graph structure SIMG, which is set as $I_{m\alpha}$:

$$I_{ma} = \begin{bmatrix} 0 & MA \\ MA^T & 0 \end{bmatrix}$$

where MA is the service invocation interaction matrix, and the adjacency matrix has a size of $(|M|+|A|)\times(|M|+|A|)$, and includes connection information of nodes in the graph structure, where T indicates matrix transpose operation;

2.3 defining a degree corresponding to the mashup service m as $d^m$ and a degree of the node corresponding to the API $\alpha$ as $d^\alpha$, combining degree information corresponding to the mashup service and the API into a degree matrix $D_{ma}$, and computing a normalized form of the adjacency matrix:

$$\tilde{I}_{ma} = D_{m\tilde{a}}^{-\frac{1}{2}} I_{ma} D_{m\tilde{a}}^{-\frac{1}{2}}$$

where an element corresponding to a position (i,j) in a normalized matrix $\tilde{I}_{m\alpha}$ has a value of $$\frac{1}{\sqrt{|d_i^m||d_j^\alpha|}},$$

where $$d_i^m$$

indicates a size of the degree corresponding to the mashup service having a sequence number of i, and $$d_j^a$$

indicates a size of the degree corresponding to the API node having a sequence number of j;

2.4 traversing node information in the graph structure SIMG, setting nodes traversed currently as $v$ including the mashup type of graph nodes and the API type of graph nodes, setting a neighbor node set of $v$ in the graph structure, i.e., a node set having a side connection with the nodes, as $N^v$, and computing a propagation result of each $v_t \in N^v$:

$$h_{v \leftarrow v_t}^l = \frac{1}{\sqrt{|d_v||d_{v_t}|}} \left( W^{l1} e_v + W^{l2} \left( e_v \otimes e_{v_t} \right) \right),$$

where l indicates the number of layers of a graph propagation structure of a multi-layer graph neural network, $W^{l1}$ and $W^{l2}$ are both trainable parameter matrixes of a current layer, $\otimes$ indicates multiplication operation of vector elements, $e_v$ indicates an embedding representation corresponding to the node v, and $e_{v_t}$ indicates an embedding representation of a neighbor node $v_t$ of the node v;

2.5 aggregating propagation information of the node v and the neighbor node of the node to form node feature embedding output of the current layer:

$$e_v^l = \sigma \left( e_v^{l-1} + \Sigma_{v_t \in N^v} h_{v \leftarrow v_t}^l \right)$$

where $\sigma$ is an activation function, $$e_v^{l-1}$$

indicates node embedding output of a previous layer, and $\Sigma$ indicates vector summation operation; and 2.6 according to properties of the node v, dividing an output node embedding result into a mashup service feature representation $$e_m^l$$

and an API feature representation $$e_a^l$$

for output.

Step 3 Includes:

3.1 with one-hot representation being a vectorized representation method, where each feature is represented by an independent binary dimension, only one dimension has a value of 1, and remaining dimensions all have a value of 0, and the dimensions are configured to represent categorical variables or discrete variables, constructing an API embedding representation based on one-hot representation, and converting, by the API embedding representation based on one-hot representation, high-dimensional one-hot representation corresponding to the API set into a dense embedding representation $AOE \in R^{|A| \times d}$ through an embedding layer, where d is a dimension of the embedding representation;

3.2 obtaining an adjacency matrix $I_\alpha \varepsilon R^{|A| \times |A|}$ of the graph structure CAFG, where when $I_\alpha[u, w]=1$, it is indicated that the API $\alpha_u$ having a sequence number of u and the API $\alpha_w$ having a sequence number of w share the same tag information;

3.3 computing a corresponding degree matrix $D_\alpha \in R^{|A| \times |A|}$, where the matrix is a diagonal matrix, where $D_\alpha[u, u]$ indicates the total number of the APIs having the same tag as $\alpha_u$;

3.4 computing a normalized adjacency matrix $$\tilde{I}_a = D_a^{-\frac{1}{2}} I_a D_a^{-\frac{1}{2}}$$

as a convolution weight of an input vector set; and 3.5 carrying out graph convolution computation on the embedding representation through the normalized adjacency matrix:

$$L^1 = \sigma \left( \tilde{I}_a P W^5 \right)$$

$$C = L^2 = \sigma \left( \tilde{I}_a L^1 W^6 \right)$$

where $\sigma$ indicates an activation function, $W^5 \in R^{d \times d}$ and $W^6 \in R^{d \times d}$ are weights of two layers respectively, computed output C is used as API feature representation output under the network structure, and has a size of $C \in R^{|A| \times d}$, and a feature representation corresponding to the service a is defined as $c_\alpha$.

Step 4 Includes:

4.1 representing a matrix consisting of all feature representation vectors of the mashup services of l-th layer output obtained in step 2.6 as $$E_m^l,$$

, representing a matrix consisting of feature representation vectors corresponding to the APIs as $$E_a^l,$$

, and combining output of a current propagation layer:

$$E_q^l = \begin{bmatrix} E_m^l \\ E_a^l \end{bmatrix}$$

4.2 combining $$E_m^l$$

and a feature matrix C output from step 3.5:

$$E_{key}^l = \begin{bmatrix} E_m^l \\ C \end{bmatrix}$$

4.3 with the attention mechanism being a common method in machine learning, and being configured to assign weights to different elements in a sequence including a query part and a key part, computing similarity between the query and the key to carry out weighted summation on the elements, so as to achieve feature extraction and weighted fusion of the sequence, and designing the mutual attention mechanism to connect the feature representations of the mashup services output by the multi-layer structure, and computing a query representation of the mutual attention mechanism:

$$q_l = W^{q|l}$$

$$q_l = W^{q|l} E_q^l$$

where $W^{q|l} \in R^{d*(|M|+|A|)}$ is a trainable weight parameter, and $q_l$ is used as an attention query corresponding to an output result of a l-th propagation layer;

4.4 computing a key representation of the mutual attention mechanism:

$$k_l = W^k$$

$$k_l = W^k E_{key}^l$$

where $W^k \in R^{d*(|M|+|A|)}$ is a trainable weight parameter, and $k_l$ indicates an attention key corresponding to an output result of the l-th propagation layer;

4.5 computing mutual attention weight information corresponding to the l-th layer:

$$\gamma_l' = \frac{q_l^T k_l}{\sqrt{d}}, \alpha_l = \frac{\exp(\gamma_l')}{\sum_{l'=1}^{L} \exp(\gamma_{l'}')},$$

where exp( ) indicates exponential power by using a natural constant e as a base, L is the total number of graph propagation layers, and T indicates vector transpose; and 4.6 weighing output of graph propagation layers:

$$aE_m^l = E_m^l \otimes \alpha_l$$

where $\otimes$ is operation of computing product of each element, and $$aE_m^l$$

indicates a weighted result of feature vectors of l-th layer output; and then connecting weighted output of the layers, and converting the weighted output into a final mashup feature representation:

$$FE_m = f_{cm}(aE_m^1 \oplus aE_m^2 \oplus \ldots \oplus aE_m^l)$$

where $\oplus$ indicates vector connection operation, $f_{cm}$ indicates a multi-layer perceptron having an input size of L*d and output of d, and the multi-layer perceptron is a model based on a neural network, and consists of a plurality of fully-connected hidden layers and output layers; and setting a mashup feature vector result corresponding to the mashup m in the matrix $FE_m$ as $fe_m$.

Step 5 Includes:

5.1 computing, by the API feature representation $$e_a^l$$

output by the graph neural network structure based on the graph structure SIMG and the API feature representation $c_\alpha$ output by the graph neural network structure based on the graph structure CAFG, a gate weight corresponding to the gate mechanism:

$$\beta = \sigma(W^g(C \oplus E_a^l))$$

where $W^g$ is a trainable weight, and $$E_a^l$$

indicates a set of $$e_a^l$$

corresponding to all the services; and 5.2 with the weight for connection, computing a final output result:

$$FE_\alpha = \beta * C + (1 - \beta) * E_a^l$$

where $FE_\alpha$ is a matrix consisting of all the API feature representations obtained by weighting feature representations in a form of a matrix; and setting a feature vector result corresponding to the API $\alpha$ in the matrix $FE_\alpha$ as $fe_\alpha$.

Step 6 Includes:

6.1 computing the training similarity between the services, and using dot product of embedding vectors of two APIs or mashup services as a similarity computation result:

$$Sim_{train}^{api}(a_1, a_2) = fe_{a_1} \cdot fe_{a_2}$$

$$Sim_{train}^{mashup}(m_1, m_2) = fe_{m_1} \cdot fe_{m_2}$$

where $\alpha_1$, $\alpha_2$ indicate any two different APIs, $$Sim_{train}^{api}(a_1, a_2)$$

$(\alpha_1, \alpha_2)$ indicates the training similarity between the APIs $\alpha_1$ and $\alpha_2$, $m_1$, $m_2$ indicates any two different mashup services, and $$Sim_{train}^{mashup}(m_1, m_2)$$

$(m_1, m_2)$ indicates the training similarity between the mashups $m_1$ and $m_2$; and 6.2 computing the prior information similarity between the services, and computing similarity between service description documents on the basis of similarity computation of the service description documents and service function tags:

$$Sim_{description}^{api}(a_1, a_2) = \cos\left(e_{a_1}^{lm}, e_{a_2}^{lm}\right) = \frac{e_{a_1}^{lm^T} e_{a_2}^{lm^T}}{\left\|e_{a_1}^{lm}\right\|\left\|e_{a_2}^{lm}\right\|}$$

$$Sim_{description}^{mashup}(m_1, m_2) = \cos\left(e_{m_1}^{lm}, e_{m_2}^{lm}\right) = \frac{e_{m_1}^{lm^T} e_{m_2}^{lm^T}}{\left\|e_{m_1}^{lm}\right\|\left\|e_{m_2}^{lm}\right\|}$$

where cos( ) indicates cosine similarity, $$e_a^{lm}$$

indicates a service function representation obtained by computation of a language model corresponding to the API $\alpha$, $$Sim_{description}^{api}(a_1, a_2)$$

$(\alpha_1\alpha_2)$ indicates the prior information similarity between the APIs $\alpha_i$ and $\alpha_2$, $\|$ $$\left\|e_a^{lm}\right\|$$

$\|$ indicates a modulus of a vector $$e_a^{lm},$$

, $$e_m^{lm}$$

indicates a service function representation obtained by computation of a language model corresponding to the mashup m, $$Sim_{description}^{mashup}$$

$(m_1, m_2)$ indicates the prior information similarity between the mashups $m_1$ and $m_2$, and $\|$ $$e_m^{lm}$$

$\|$ indicates a modulus of a vector $$e_m^{lm}$$

;

6.3 computing similarity between service tags:

$$Sim_{tag}^{api}(a_1, a_2) = \frac{\left|a_{tag}^1 \cap a_{tag}^2\right|}{\left|a_{tag}^1\right| + \left|a_{tag}^2\right| - \left|a_{tag}^1 \cap a_{tag}^2\right|}$$

$$Sim_{tag}^{mashup}(m_1, m_2) = \frac{\left|m_{tag}^1 \cap m_{tag}^2\right|}{\left|m_{tag}^1\right| + \left|m_{tag}^2\right| - \left|m_{tag}^1 \cap m_{tag}^2\right|}$$

where $m_{tag}$ indicates a function tag set of the mashup, $\alpha_{tag}$ indicates a tag set of the APIs, $|m_{tag}|$ indicates the number of mashup function tags, and $|\alpha_{tag}|$ indicates the number of the API function tags;

6.4 using a larger result between function description similarity and tag similarity as prior information similarity between the services:

$$Sim_{info}^{api}(a_1, a_2) = \max\left(\widetilde{Sim}_{description}^{api}(a_1, a_2), \widetilde{Sim}_{tag}^{api}(a_1, a_2)\right)$$

$$Sim_{info}^{mashup}(m_1, m_2) = \max\left(\widetilde{Sim}_{description}^{mashup}(a_1, a_2), \widetilde{Sim}_{tag}^{mashup}(m_1, m_2)\right)$$

where ( $\widetilde{Sim}$ ) indicates a normalized similarity result;

6.5 using a larger result between the training similarity between the services and the prior information similarity as overall similarity information between the services:

$$Sim_a(a_1, a_2) = \max\left(\widetilde{Sim}_{train}^{api}(a_1, a_2), \widetilde{Sim}_{info}^{api}(a_1, a_2)\right)$$

$$Sim_m(m_1, m_2) = \max\left(\widetilde{Sim}_{train}^{mashup}(m_1, m_2), \widetilde{Sim}_{info}^{mashup}(m_1, m_2)\right)$$

computing similarity information between the services as a basis for data augmentation;

6.6 designing four service sequence data augmentation methods as follows:

(1) service cutting: for a service sequence $m\alpha_c=\{\alpha_1, \alpha_2, \ldots, \alpha_{|m\alpha_c|}\}$, selecting a continuous subsequence having a length of $L_{sc}=\mu^*|m\alpha_c\|$ from a random position as an augmented sequence, where $\mu \in (0,1)$ is a random cutting parameter, where $|m\alpha_c|$ is the number of the APIs in the service invocation sequence;

(2) service occlusion: for a service sequence $m\alpha_c$ $\{\alpha_1, \alpha_2, \ldots, \alpha_{|m\alpha_c|}\}$, randomly discarding the APIs of the number being $L_{sm}=\|\eta*|m\alpha_c\|$, where $\eta \in (0,1)$ is a random occlusion parameter, where $|m\alpha_c|$ is the number of the APIs in the service invocation sequence;

(3) association replacement: for a service invocation sequence $m\alpha_c=\{\alpha_1, \alpha_2, \ldots, a|m\alpha_c|\}$, randomly selecting an item $L_{rc}=\|\gamma*|m\alpha_c\|$, and replacing the item with a service having high function correlation, where $\gamma \in (0,1)$ indicates a replacement probability parameter, and $|m\alpha_c|$ is the number of the APIs in the service invocation sequence;

(4) association expansion: for a service invocation sequence $m\alpha_c$ $\{\alpha_1, \alpha_2, \ldots, \alpha_{|m\alpha_c|}\}$, randomly selecting an item $L_{re}=|\varepsilon*|m\alpha_c\|$, and inserting a service having high function correlation with the item into a position in which the item is located, where $\varepsilon \in (0,1)$ indicates an expansion probability parameter, where $|m\alpha_c|$ is the number of the APIs in the service invocation sequence; and in the augmentation methods (3) and (4), determining service function correlation through similarity information between the services obtained in step 6.5, with respect to the association replacement method (3), for $L_{rc}$ services randomly selected, obtaining, through a similarity computation result between the services provided in step 6.5, services having the highest function similarity from candidate services, apart from services existing in an original sequence, as new services, so as to replace the services randomly selected, and with respect to the association expansion method (4), for $L_{re}$ services randomly selected, obtaining, through a similarity computation result between the services provided in step 6.5, services having the highest function similarity from candidate services, apart from services existing in an original sequence, as new services, and adding the new services after original positions in sequences in which the services randomly selected are located to complete sequence augmentation;

6.7 for the mashup service set M, traversing the mashup services in M, setting a single mashup service traversed currently as m, for the service invocation sequence $m\alpha_m$, corresponding to m, selecting two sequence data augmentation methods provided in step 6.6 to process the sequence, so as to generate two newly augmented sequence results, which are represented as $\alpha sm1$ and $\alpha sm2$ respectively, for the API set A, traversing the APIs in A, setting a single API traversed currently as $\alpha$, setting a mashup sequence that invoked the API as $\alpha m_\alpha$, and selecting two sequence data augmentation methods provided in step 6.6 to process the sequence, so as to generate two newly augmented sequence results, which are represented as $ms\alpha1$ and $ms\alpha2$ respectively;

Preferably, in step 6.7, a process of selecting the augmentation methods and generating the augmented sequence pairs includes:

6.7.1 setting a set for storing combined data augmentation methods, which is set as $aug_{list}$ and is initially an empty set; and storing the four service sequence data augmentation methods in step 6.6 into a set DA, setting the number of elements in the set as nd, and setting a count index as 1;

6.7.2 traversing DA, and setting a method object traversed currently as $d\alpha$;

6.7.3 for each traversal, assigning index+1 to target;

6.7.4 when target is less than nd, storing da into $aug_{list}$, storing augmentation methods having a sequence number of target in DA into $aug_{list}$, and adding 1 to target;

6.7.5 repeating steps 6.7.3 and 6.7.4 until target has a value greater than or equal to nd;

6.7.6 adding 1 to index;

6.7.7 ending traversal, and completing initialization of the set $aug_{list}$;

6.7.8 assigning 0 to a counter now, and setting a set for storing augmented sequence pairs, which is set as ASP, and is initially an empty set;

6.7.9 traversing the API invocation sequence $m\alpha$ of the mashup, and storing the invocation sequences corresponding to all the mashups in the set M into the set, which are set as SM;

6.7.10 traversing the set SM, and setting a current traversal sequence as sm;

6.7.11 obtaining data augmentation methods having a sequence number of now in $aug_{list}$ to process sm, and setting a generated augmented sequence as $\alpha sm1$;

6.7.12 adding 1 to now, and setting now as 0 when now has a size equal to nd;

6.7.13 obtaining data augmentation methods having a sequence number of now in $aug_{list}$ to process sm, and setting a generated augmented sequence as $\alpha sm2$;

6.7.14 adding 1 to now, and setting now to 0 when now has a size equal to nd;

6.7.15 storing pair-wise augmented sequence results ($\alpha sm1$, $\alpha sm2$) into an augmented sequence pair set ASP;

6.7.16 completing traversal of the set SM;

6.7.17 traversing the mashup invocation sequence am of the APIs, and storing invoked sequences corresponding to all APIs in the set A into the set, which are set as SA;

6.7.18 traversing the set SA, and setting a current traversal sequence as sa;

6.7.19 obtaining data augmentation methods having a sequence number of now in $aug_{list}$ to process sa, and setting a generated augmented sequence as $ms\alpha1$;

6.7.20 adding 1 to now, and setting now as 0 when now has a size equal to nd;

6.7.21 obtaining data augmentation methods having a sequence number of now in $aug_{list}$ to process $s\alpha$, and setting a generated augmented sequence as $ms\alpha2$;

6.7.22 adding 1 to now, and setting now to 0 when now has a size equal to nd;

6.7.23 storing pair-wise augmented sequence results ($ms\alpha1$, $ms\alpha2$) into an augmented sequence pair set ASP; and 6.7.24 completing traversal, and outputting a pair-wise augmented sequence result set ASP.

6.8 obtaining API feature representations corresponding to all APIs in $\alpha sm1$ in an API feature representation matrix $FE_\alpha$, and carrying out mean-pooling processing on all the obtained feature representations as a representation result corresponding to the sequence $\alpha sm1$, which is set as $$d_m^{aug1}$$

; averaging dimensions of feature vectors to obtain a new feature vector, carrying out the same processing on $\alpha sm2$ to obtain a representation result, which is set as $$e_m^{aug2}$$

, obtaining mashup feature representations corresponding to all mashup services in $ms\alpha 1$ in a mashup feature representation matrix $FE_m$, carrying out mean-pooling processing on all the obtained feature representations as a representation result corresponding to the sequence $ms\alpha 1$, which is set as $$e_a^{aug1}$$

and carrying out the same processing on $ms\alpha 2$ to obtain a representation result, which is set as $$e_a^{aug2}$$

; and 6.9 completing traversal, and computing a contrastive loss result for augmented sequence pairs generated by all the mashup services:

$$\mathcal{L}_{cl}^m = \sum_{m \in M} -\log \frac{\exp\left((e_m^{aug1} \cdot e_m^{aug2})/\tau\right)}{\sum_{m'!=m} \exp\left((e_m^{aug1} \cdot e_{m'}^{aug2}/\tau\right)}$$

computing a contrastive loss result for augmented sequence pairs corresponding to all the APIs:

$$\mathcal{L}_{cl}^a = \sum_{a \in A} -\log \frac{\exp\left((e_a^{aug1} \cdot e_a^{aug2})/\tau\right)}{\sum_{a'!=a} \exp\left((e_{a'}^{aug1} \cdot e_{a'}^{aug2}/\tau\right)}$$

an overall loss result is as follows:

$$\mathcal{L}_{cl} = \mathcal{L}_{cl}^m + \mathcal{L}_{cl}^a$$

where $\tau$ is a temperature coefficient, and is configured to control discrimination of the model to negative samples to adjust generalization capability of the model, and log indicates a logarithmic function.

Step 7 Includes:

7.1 computing a pair-wise recommendation score between the mashup m and the candidate API $\alpha$":

$$\hat{\gamma}_{m,\alpha}=$$

$$fe_m^T$$

$fe_\alpha$, where T indicates vector transpose;

7.2 for the mashup service m, optimizing parameters through a pair-wise Bayesian personalized ranking loss (BPR) on the basis of service invocation information in training data, where APIs invoked by the mashup in a data set are called as a positive invocation example, which is defined as $X_m^+$, remaining candidate APIs are called as a negative invocation example $X_m^-$, and an overall loss function is computed as:

$$\mathcal{L}_{bpr} = \sum_{(m,a',b') \in O} -\ln\sigma\left(\hat{y}_{m,a'} - \hat{y}_{m,b'}\right)$$

where $O \in \{(m, \alpha', b')|(m, \alpha') \in X_m^+, (m, b') \in X_m^-\}$, and a' and b' indicate a positive API obtained by sampling and a negative API obtained by sampling respectively;

7.3 computing an overall loss result according to steps 6.9 and 7.2:

$$\mathcal{L} = \mathcal{L}_{bpr} + \theta \cdot \mathcal{L}_{cl}$$

where $\theta$ is a hyper-parameter for controlling intensity of contrastive learning; and 7.4 cycling the overall model from steps 1 to 7, and optimizing the overall model through the loss function in step 7.3 to fit the data set by model parameters.

Step 8 Includes:

8.1 converting the user request for constructing a new combined service into a vector representation through a language model, matching the similarity between the vector representation and mashup service function description in an existing data set, and using q objects having the highest similarity in the vector representation as associated mashup services, which are represented as relationM={$rm_1$, $rm_2$, . . . , $rm_q$};

8.2 carrying out mean-pooling operation on representations $$e_m^l$$

corresponding to mashup services in the set relationM to construct a feature representation $e_{newR}$ corresponding to the user request, where mean-pooling is common pooling operation; and averaging dimensions of the feature vector to obtain a new feature vector;

8.3 transmitting $e_{newR}$ into a recommendation model optimized through step 6 to output a corresponding feature representation result $$e_{newR}^l$$

8.4 traversing candidate APIs, setting APIs traversed currently as $\alpha$, computing corresponding pair-wise recommendation scores $\gamma_{newR,\alpha}$ according to the method in step 7.1, and forming, by all the pair-wise recommendation scores, a set $Y_{newR}$; and 8.5 sorting $Y_{newR}$ from large to small, and outputting top k APIs to complete API service recommendation for the new combined request.

The present invention has the beneficial effects: (1) according to service data characteristics and an invocation structure, the double-graph structure is designed to fuse various information and better learn service function characteristics; (2) on the basis of the graph neural network, the service recommendation model is optimized end to end, thereby improving the effect of service recommendation; (3) a multi-layer graph neural network by using the invocation graph structure as input is designed to fuse representation results between services by means of different model structures; (4) according to characteristics of multi-layer graph propagation results, the mutual attention mechanism is designed to integrate feature representation results of multi-layer output; and (5) a contrastive learning method is designed to augment data of the sequence, thereby alleviating the problem of data sparsity, and improving the effect of service recommendation.

DETAILED DESCRIPTION OF THE EMBODIMENTS

Figure 1:
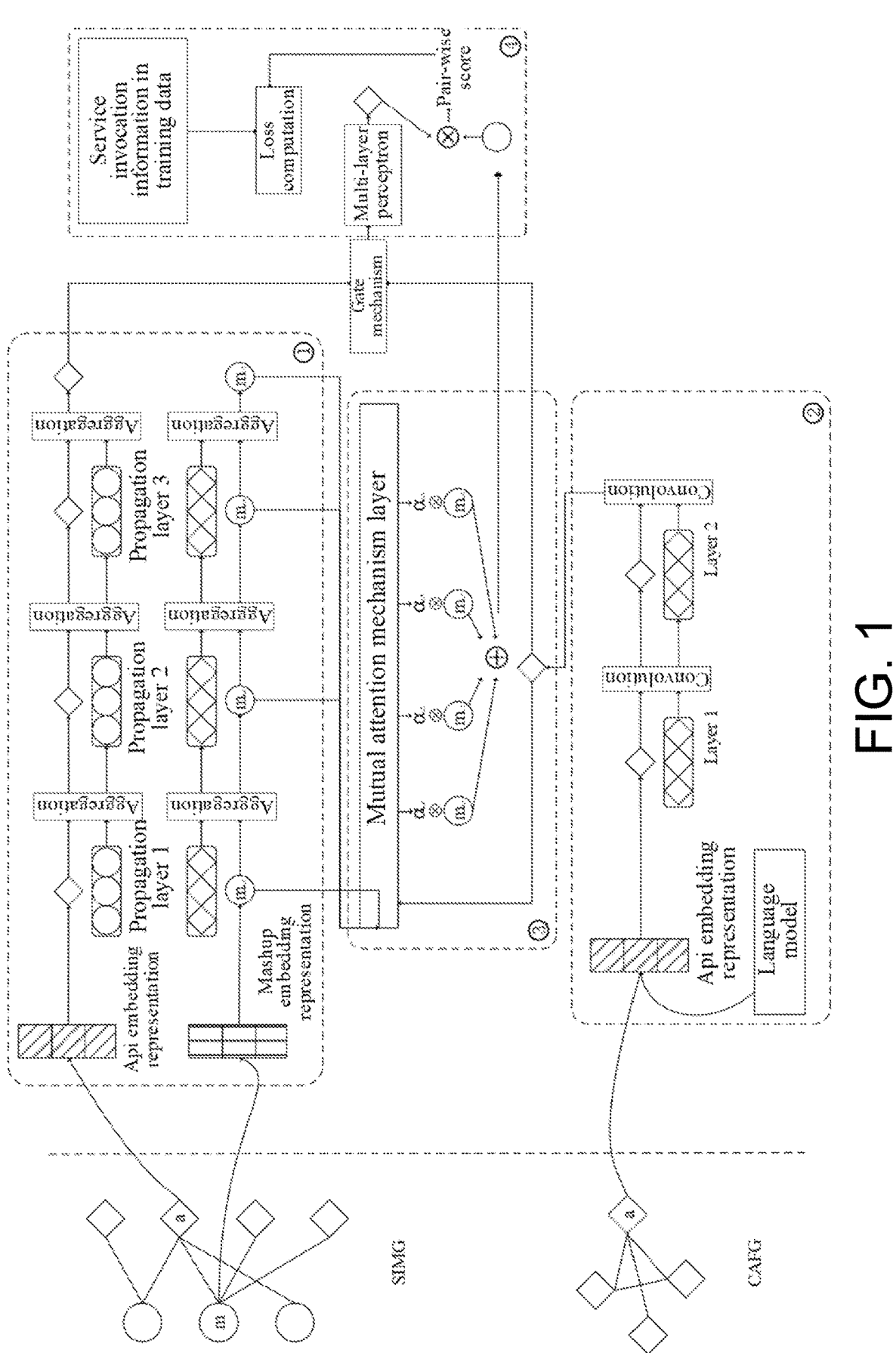
FIG. 1 is a schematic diagram of an overall structure of a service recommendation model.

The present invention will be further described below with reference to the accompanying drawings.

With reference to FIGS. 1-4, a cloud-native application programming interface (API) recommendation method fusing data augmentation and contrastive learning includes:

step 1, on the basis of service invocation matrix information and function association information between APIs, construct an invocation graph structure, service invocation matrix graph (SIMG), between mashup services and API services and an invocation graph structure, connecting API functional graph (CAFG), between the APIs to form a double-graph structure. The step includes:

1.1 represent mashup services in a mashup service set M as a mashup type of graph nodes, represent APIs in an API set A as an API type of graph nodes, and represent an overall graph node set as $V_{m\alpha}$;

1.2 set an empty set $\varepsilon_{m\alpha}$ as a storage set of side information in the graph structure SIMG;

1.3 traverse the mashup services in M, set a single mashup service traversed currently as m, and obtain an API set $m_{invoke}$ invoked by the set M from an invocation interaction matrix MA between the mashups and the APIs, where the service invocation interaction matrix MA has a size of $|M| \times |A|$, where $|M|$ indicates the number of elements in the set M, and $|A|$ indicates the number of elements in the set A;

1.4 traverse the API set $m_{invoke}$ obtained in a previous step, set the APIs traversed currently as $\alpha$, and with when a value corresponding to a corresponding position $[m, \alpha]$ in the invocation interaction matrix MA is 1, which indicates that an invocation relation exists between m and $\alpha$, store a side combination (m, $\alpha$) into $\varepsilon_{m\alpha}$, which indicates that an undirected connection side exists between graph nodes corresponding to m and $\alpha$;

1.5 complete traversal, and combine a graph node set $V_{m\alpha}$ and a side information set $\varepsilon_{m\alpha}$ to complete construction of a graph structure SIMG ($V_{m\alpha}$, $\varepsilon_{m\alpha}$)

1.6 convert the API set A into a graph node set, which is represented as $V_{\alpha}$;

1.7 set an empty set $\varepsilon_{\alpha}$ as a storage set of side information in the graph structure CAFG;

1.8 traverse the APIs in the set A, setting a single API traversed currently as $\alpha_1$, on this basis, traverse the APIs in A apart from $\alpha_1$, and set a single API traversed currently as $\alpha_2$;

1.9 with a tag information set $A^{tag}$ of the APIs including tags corresponding to the APIs, set a tag set corresponding to the APIs $\alpha_1$ as $$A_{a1}^{tag}$$

, set a tag set corresponding to the APIs $\alpha_2$ as $$A_{a2}^{tag}$$

, and when $$A_{a1}^{tag}$$

$$\cap$$

$$A_{a2}^{tag}$$

is not an empty set, store a side combination ($\alpha_1$, $\alpha_2$) into $\varepsilon_{\alpha}$, which indicates that an undirected connection side exists between graph nodes corresponding to $\alpha_1$ and $\alpha_2$; and 1.10 complete traversal, and combine the graph node set $V_{\alpha}$ and the side information set $\varepsilon_{\alpha}$ to complete construction of a graph structure CAFG($V_{\alpha}$, $\varepsilon_{\alpha}$).

Step 2, according to the graph structure SIMG, design a multi-layer graph propagation network structure to learn mashup feature representations and API feature representations. As shown in part ① in FIG. 1, a schematic diagram of three layers of graph propagation structure is provided. The process is as follows:

2.1 construct an embedding layer to store embedding vector information of the mashup services and API nodes in forms of:

$$E_{mashup} = \left\{ e_{m_1}, e_{m_2}, \ldots, e_{m_{|M|}} \right\}$$

$$E_a = \left\{ e_{a_1}, e_{a_2}, \ldots e_{a_{|A|}} \right\}$$

$$E = \begin{bmatrix} E_{mashup} \\ E_a \end{bmatrix}$$

where $E_{mashup}$ indicates embedding representations corresponding to the mashup services, and $E_{\alpha}$ indicates embedding representations corresponding to the APIs; and combine $E_{mashup}$ and $E_{\alpha}$ to obtain an embedding layer embedding matrix E;

2.2 compute an adjacency matrix of the graph structure SIMG, which is set as $I_{ma}$:

$$I_{ma} = \begin{bmatrix} 0 & MA \\ MA^T & 0 \end{bmatrix}$$

where MA is the service invocation interaction matrix, and the adjacency matrix has a size of $(|M|+|A|)\times(|M|+|A|)$, and includes connection information of nodes in the graph structure, where T indicates matrix transpose operation;

2.3 define a degree corresponding to the mashup service $D_{m\alpha}$ as $d^m$ and a degree of the node corresponding to the API $\alpha$ as $d^\alpha$, combine degree information corresponding to the mashup service and the API into a degree matrix $D_{m\alpha}$, and compute a normalized form of the adjacency matrix:

$$\tilde{I}_{ma} = D_{m\tilde{a}}^{-\frac{1}{2}} I_{ma} D_{m\tilde{a}}^{-\frac{1}{2}}$$

where an element corresponding to a position (i,j) in a normalized matrix $\tilde{I}_{m\alpha}$ has a value of $$\frac{1}{\sqrt{|d_i^m||d_j^\alpha|}},$$

where $$d_i^m$$

indicates a size of the degree corresponding to the mashup service having a sequence number of i, and $$d_j^\alpha$$

indicates a size of the degree corresponding to the API node having a sequence number of j;

2.4 traverse node information in the graph structure SIMG, set nodes traversed currently as $v$ including the mashup type of graph nodes and the API type of graph nodes, set a neighbor node set of $v$ in the graph structure, i.e., a node set having a side connection with the nodes, as $N^v$, and compute a propagation result of each $v_t \in N^v$:

$$h_{v \leftarrow v_t}^l = \frac{1}{\sqrt{|d_v||d_{v_t}|}}\left(W^{l1}e_v + W^{l2}(e_v \otimes e_{v_t})\right),$$

where l indicates the number of layers of a graph propagation structure of a multi-layer graph neural network, $W^{l1}$ and $W^{l2}$ are both trainable parameter matrixes of a current layer, $\otimes$ indicates multiplication operation of vector elements, $e_v$ indicates an embedding representation corresponding to the node $v$, and $e_{v_t}$ indicates an embedding representation of a neighbor node $v_t$ of the node $v$;

2.5 aggregate propagation information of the node $v$ and the neighbor node of the node to form node feature embedding output of the current layer:

$$e_v^l = \sigma\left(e_v^{l-1} + \sum_{v_t \in N^v} h_{v \leftarrow v_t}^l\right)$$

where $\sigma$ is an activation function, $$e_v^{l-1}$$

indicates node embedding output of a previous layer, and $\Sigma$ indicates vector summation operation; and 2.6 according to properties of the node $v$, divide an output node embedding result into a mashup service feature representation $$e_m^l$$

and an API feature representation $$e_a^l$$

for output.

Step 3, according to the graph structure CAFG, design a corresponding graph neural network structure to compute feature representations corresponding to APIs under the graph neural network structure. As shown in part ② in FIG. 1, a schematic diagram of a double-layer graph convolution structure is provided. The process is as follows:

3.1 with one-hot representation being a vectorized representation method, where each feature is represented by an independent binary dimension, only one dimension has a value of 1, and remaining dimensions all have a value of 0, and the dimensions are configured to represent categorical variables or discrete variables, construct an API embedding representation based on one-hot representation, and convert, by the API embedding representation based on one-hot representation, high-dimensional one-hot representation corresponding to the API set into a dense embedding representation $AOE \in R^{|A| \times d}$ through an embedding layer, where d is a dimension of the embedding representation;

3.2 obtain an adjacency matrix $I_\alpha \in R^{|A| \times |A|}$ of the graph structure CAFG, where when $I_\alpha[u, w]=1$, it is indicated that the API $\alpha_u$ having a sequence number of u and the API $\alpha_w$ having a sequence number of w share the same tag information;

3.3 computing a corresponding degree matrix $D_\alpha \in R^{|A| \times |A|}$, where the matrix is a diagonal matrix, where $D_\alpha[u, u]$ indicates the total number of the APIs having the same tag as $\alpha_u$;

3.4 compute a normalized adjacency matrix $$\tilde{I}_a = D_a^{-\frac{1}{2}} I_a D_a^{-\frac{1}{2}}$$

as a convolution weight of an input vector set; and 3.5 carry out graph convolution computation on the embedding representation through the normalized adjacency matrix:

$$L^1 = \sigma\left(\tilde{I}_a P W^5\right)$$

$$C = L^2 = \sigma\left(\tilde{I}_a L^1 W^6\right)$$

where $\sigma$ indicates an activation function, $W^5 \in R^{d \times d}$ and $W^6 \in R^{d \times d}$ are weights of two layers respectively, computed output C is used as API feature representation output under the network structure, and has a size of $C \in R^{|A| \times d}$, and a feature representation corresponding to the service a is defined as step 4, design a mutual attention mechanism layer to retain multi-layer output information, and compute attention weights of multi-layer output and merge feature representations of the mashup services by taking association information of the APIs as importance guidance. As shown in part ③ in FIG. 1, a schematic diagram of a double-layer graph convolution structure is provided. The process is as follows:

4.1 represent a matrix consisting of all feature representation vectors of the mashup services of l-th layer output obtained in step 2.6 as $$E_m^l$$

, represent a matrix consisting of feature representation vectors corresponding to the APIs as $$E_a^l$$

, and combine output of a current propagation layer:

$$E_q^l = \begin{bmatrix} E_m^l \\ E_a^l \end{bmatrix}$$

4.2 combine $$E_m^l$$

and a feature matrix C output from step 3.5:

$$E_{key}^l = \begin{bmatrix} E_m^l \\ C \end{bmatrix}$$

4.3 with the attention mechanism being a common method in machine learning, and being configured to assign weights to different elements in a sequence including a query part and a key part, compute similarity between the query and the key to carry out weighted summation on the elements, so as to achieve feature extraction and weighted fusion of the sequence, and design the mutual attention mechanism to connect the feature representations of the mashup services output by the multi-layer structure, and compute a query representation of the mutual attention mechanism:

$$q_l = W^{q|l} E_q^l$$

where $W^{q|l} \in R^{d*(|M|+|A|)}$ is a trainable weight parameter, and $q_1$ is used as an attention query corresponding to an output result of a l-th propagation layer;

4.4 compute a key representation of the mutual attention mechanism:

$$k_l = W^k$$

$$E_{key}^l$$

where $W^k \in R^{d*(|M|+|A|)}$ is a trainable weight parameter, and $k_l$ indicates an attention key corresponding to an output result of the l-th propagation layer;

4.5 compute mutual attention weight information corresponding to the l-th layer:

$$\gamma_l' = \frac{q_l^T k_l}{\sqrt{d}}, \quad \alpha_l = \frac{\exp(\gamma_l')}{\sum_{l'=1}^{L} \exp(\gamma_{l'}')}$$

where exp( ) indicates exponential power by using a natural constant e as a base, L is the total number of graph propagation layers, and T indicates vector transpose; and 4.6 weigh output of graph propagation layers:

$$aE_m^l = E_m^l \otimes \alpha_l$$

where $\otimes$ is operation of computing product of each element, and $$aE_m^l$$

indicates a weighted result of feature vectors of l-th layer output; and then connect weighted output of the layers, and convert the weighted output into a final mashup feature representation:

$$FE_m = f_{cm}\left(aE_m^1 \oplus aE_m^2 \oplus \ldots \oplus aE_m^l\right)$$

where $\oplus$ indicates vector connection operation, $f_{cm}$ indicates a multi-layer perceptron having an input size of L*d and output of d, and the multi-layer perceptron is a model based on a neural network, and consists of a plurality of fully-connected hidden layers and output layers; and set a mashup feature vector result corresponding to the mashup m in the matrix $FE_m$, as $fe_m$.

step 5, carry out weighted combination on API feature representations of double graphs through a gate mechanism to generate a new API feature representation. The process is as follows:

5.1 compute, by the API feature representation $$e_a^l$$

output by the graph neural network structure based on the graph structure SIMG and the API feature representation $c_\alpha$ output by the graph neural network structure based on the graph structure CAFG, a gate weight corresponding to the gate mechanism:

$$\beta = \sigma\big(W^g\big(C \oplus E_a^l\big)\big)$$

where $W^g$ is a trainable weight, and $$E_a^l$$

indicates a set of $$e_a^l$$

corresponding to all the services; and 5.2 with the weight for connection, compute a final output result:

$$FE_a = \beta * C + (1 - \beta) * E_a^l$$

where $FE_\alpha$ is a matrix consisting of all the API feature representations obtained by weighting feature representations in a form of a matrix; and set a feature vector result corresponding to the API $\alpha$ in the matrix $FE_\alpha$ as $fe_\alpha$.

step 6, compute training similarity and prior information similarity between services, and generate data augmented sequence pairs through a data augmentation method. The process is as follows:

6.1 compute the training similarity between the services, and use dot product of embedding vectors of two APIs or mashup services as a similarity computation result:

$$Sim_{train}^{api}(a_1, a_2) = fe_{a_1} \cdot fe_{a_2}$$

$$Sim_{train}^{mashup}(m_1, m_2) = fe_{m_1} \cdot fe_{m_2}$$

where $\alpha_1$, $\alpha_2$ indicate any two different APIs, $$Sim_{train}^{api}$$

$(\alpha_1, \alpha_2)$ indicates the training similarity between the APIs $\alpha_1$ and $\alpha_2$, $m_1$, $m_2$ indicates any two different mashup services, and $$Sim_{train}^{mashup}$$

$(m_1, m_2)$ indicates the training similarity between the mashups $m_1$ and $m_2$; and 6.2 compute the prior information similarity between the services, and compute similarity between service description documents on the basis of similarity computation of the service description documents and service function tags:

$$Sim_{description}^{api}(a_1, a_2) = \cos\big(e_{a_1}^{lm}, e_{a_2}^{lm}\big) = \frac{e_{a_1}^{lm^T} e_{a_2}^{lm}}{\big\|e_{a_1}^{lm}\big\|\big\|e_{a_2}^{lm}\big\|}$$

$$Sim_{description}^{mashup}(m_1, m_2) = \cos\big(e_{m_1}^{lm}, e_{m_2}^{lm}\big) = \frac{e_{m_1}^{lm^T} e_{m_2}^{lm}}{\big\|e_{m_1}^{lm}\big\|\big\|e_{m_2}^{lm}\big\|}$$

where cos( ) indicates cosine similarity, $$e_a^{lm}$$

indicates a service function representation obtained by computation of a language model corresponding to the API $\alpha$, $$Sim_{description}^{api}$$

$(\alpha_1, \alpha_2)$ indicates the prior information similarity between the APIs $\alpha_1$ and $\alpha_2$, $\|$ $$e_a^{lm}$$

$\|$ indicates a modulus of a vector $$e_a^{lm}$$

, $$e_m^{lm}$$

indicates a service function representation obtained by computation of a language model corresponding to the mashup m, $$Sim_{description}^{mashup}$$

$(m_1, m_2)$ indicates the prior information similarity between the mashups $m_1$ and $m_2$, and $\|$ $$e_m^{lm}$$

|| indicates a modulus of a vector $$e_m^{lm};$$

6.3 compute similarity between service tags:

$$Sim_{tag}^{api}(a_1, a_2) = \frac{|a_{tag}^1 \cap a_{tag}^2|}{|a_{tag}^1| + |a_{tag}^2| - |a_{tag}^1 \cap a_{tag}^2|}$$

$$Sim_{tag}^{mashup}(m_1, m_2) = \frac{|m_{tag}^1 \cap m_{tag}^2|}{|m_{tag}^1| + |m_{tag}^2| - |m_{tag}^1 \cap m_{tag}^2|}$$

where $m_{tag}$ indicates a function tag set of the mashup, $\alpha_{tag}$ indicates a tag set of the APIs, $|m_{tag}|$ indicates the number of mashup function tags, and $|\alpha_{tag}|$ indicates the number of the API function tags;

6.4 use a larger result between function description similarity and tag similarity as prior information similarity between the services:

$$Sim_{info}^{api}(a_1, a_2) = \max\left(\widetilde{Sim}_{description}^{api}(a_1, a_2), \widetilde{Sim}_{tag}^{api}(a_1, a_2)\right)$$

$$Sim_{info}^{mashup}(m_1, m_2) = \max\left(\widetilde{Sim}_{description}^{mashup}(m_1, m_2), \widetilde{Sim}_{tag}^{mashup}(m_1, m_2)\right)$$

where ($\widetilde{Sim}$) indicates a normalized similarity result;

6.5 use a larger result between the training similarity between the services and the prior information similarity as overall similarity information between the services:

$$Sim_a(a_1, a_2) = \max\left(\widetilde{Sim}_{train}^{api}(a_1, a_2), \widetilde{Sim}_{info}^{api}(a_1, a_2)\right)$$

$$Sim_m(m_1, m_2) = \max\left(\widetilde{Sim}_{train}^{mashup}(m_1, m_2), \widetilde{Sim}_{info}^{mashup}(m_1, m_2)\right)$$

compute similarity information between the services as a basis for data augmentation;

6.6 design four service sequence data augmentation methods as follows:

(1) service cutting: for a service sequence $m\alpha_c = \{\alpha_1, \alpha_2, \ldots, \alpha_{|m\alpha_c|}\}$, select a continuous subsequence having a length of $L_{sc} = |\mu * |m\alpha_c||$ from a random position as an augmented sequence, where $\mu \in (0,1)$ is a random cutting parameter, where $|m\alpha_c|$ is the number of the APIs in the service invocation sequence;

(2) service occlusion: for a service sequence $m\alpha_c \{\alpha_1, \alpha_2, \ldots, \alpha_{|m\alpha_c|}\}$, randomly discard the APIs of the number being $L_{sm} = |\eta * |m\alpha_c||$, where $\eta \in (0,1)$ is a random occlusion parameter, where $|m\alpha_c|$ is the number of the APIs in the service invocation sequence;

(3) association replacement: for a service invocation sequence $m\alpha_c = \{\alpha_1, \alpha_2, \ldots, \alpha_{|m\alpha_c|}\}$, randomly select an item, $L_{rc} = |\gamma * |m\alpha_c||$ and replace the item with a service having high function correlation, where $\gamma \in (0,1)$ indicates a replacement probability parameter, and $|m\alpha_c|$ is the number of the APIs in the service invocation sequence;

(4) association expansion: for a service invocation sequence $m\alpha_c \{\alpha_1, \alpha_2, \ldots, \alpha|_{m\alpha_c}|\}$, randomly select an item $L_{re} = |\varepsilon * |m\alpha_c||$, and insert a service having high function correlation with the item into a position in which the item is located, where $\varepsilon \in (0,1)$ indicates an expansion probability parameter, where $|m\alpha_c|$ is the number of the APIs in the service invocation sequence; and in the augmentation methods (3) and (4), determine service function correlation through similarity information between the services obtained in step 6.5, with respect to the association replacement method (3), for $L_{rc}$ services randomly selected, obtain, through a similarity computation result between the services provided in step 6.5, services having the highest function similarity from candidate services, apart from services existing in an original sequence, as new services, so as to replace the services randomly selected, and with respect to the association expansion method (4), for $L_{re}$ services randomly selected, obtain, through a similarity computation result between the services provided in step 6.5, services having the highest function similarity from candidate services, apart from services existing in an original sequence, as new services, and add the new services after original positions in sequences in which the services randomly selected are located to complete sequence augmentation;

6.7 for the mashup service set M, traverse the mashup services in M, set a single mashup service traversed currently as m, for the service invocation sequence $m\alpha_m$, corresponding to m, select two sequence data augmentation methods provided in step 6.6 to process the sequence, so as to generate two newly augmented sequence results, which are represented as $\alpha sm1$ and $\alpha sm2$ respectively, for the API set A, traverse the APIs in A, set a single API traversed currently as $\alpha$, set a mashup sequence that invoked the API as $\alpha m_\alpha$, and select two sequence data augmentation methods provided in step 6.6 to process the sequence, so as to generate two newly augmented sequence results, which are represented as $ms\alpha1$ and $ms\alpha2$ respectively. A process of selecting the augmentation methods and generating the augmented sequence pairs includes:

6.7.1 set a set for storing combined data augmentation methods, which is set as $aug_{list}$ and is initially an empty set; and store the four service sequence data augmentation methods in step 6.6 into a set DA, set the number of elements in the set as, and set a count index as 1;

6.7.2 traverse DA, and set a method object traversed currently as $d\alpha$;

6.7.3 for each traversal, assign index+1 to target;

6.7.4 when target is less than nd, store $d\alpha$ into $aug_{list}$, store augmentation methods having a sequence number of target in DA into $aug_{list}$, and add 1 to target;

6.7.5 repeat steps 6.7.3 and 6.7.4 until target has a value greater than or equal to nd;

6.7.6 add 1 to index;

6.7.7 end traversal, and complete initialization of the set $aug_{list}$;

6.7.8 assign 0 to a counter now, and set a set for storing augmented sequence pairs, which is set as ASP, and is initially an empty set;

6.7.9 traverse the API invocation sequence $m\alpha$ of the mashup, and store the invocation sequences corresponding to all the mashups in the set M into the set, which are set as SM;

6.7.10 traverse the set SM, and set a current traversal sequence as sm;

6.7.11 obtain data augmentation methods having a sequence number of now in $aug_{list}$ to process sm, and set a generated augmented sequence as $\alpha sm1$;

6.7.12 add 1 to now, and set now as 0 when now has a size equal to nd;

6.7.13 obtain data augmentation methods having a sequence number of now in $aug_{list}$ to process sm, and set a generated augmented sequence as αsm2;

6.7.14 add 1 to now, and set now to 0 when now has a size equal to nd;

6.7.15 store pair-wise augmented sequence results (αsm1, αsm2) into an augmented sequence pair set ASP;

6.7.16 complete traversal of the set SM;

6.7.17 traverse the mashup invocation sequence am of the APIs, and store invoked sequences corresponding to all APIs in the set A into the set, which are set as SA;

6.7.18 traverse the set SA, and set a current traversal sequence as sα;

6.7.19 obtain data augmentation methods having a sequence number of now in $aug_{list}$ to process sa, and set a generated augmented sequence as msα1;

6.7.20 add 1 to now, and sett now as 0 when now has a size equal to nd;

6.7.21 obtain data augmentation methods having a sequence number of now in $aug_{list}$ to process sα, and set a generated augmented sequence as msα2;

6.7.22 add 1 to now, and setting now to 0 when now has a size equal to nd;

6.7.23 store pair-wise augmented sequence results (msα1, msα2) into an augmented sequence pair set ASP; and 6.7.24 complete traversal, and output a pair-wise augmented sequence result set ASP.

6.8 obtain API feature representations corresponding to all APIs in αsm1 in an API feature representation matrix $FE_α$, and carry out mean-pooling processing on all the obtained feature representations as a representation result corresponding to the sequence αsm1, which is set as $$e_m^{aug1}$$

; with mean-pooling being common pooling operation, average dimensions of feature vectors to obtain a new feature vector, carry out the same processing on αsm2 to obtain a representation result, which is set as $$e_m^{aug2}$$

, obtain mashup feature representations corresponding to all mashup services in msα1 in a mashup feature representation matrix $FE_m$, carry out mean-pooling processing on all the obtained feature representations as a representation result corresponding to the sequence msα1, which is set as $$e_a^{aug1}$$

, and carry out the same processing on msα2 to obtain a representation result, which is set as $$e_a^{aug2}$$

; and 6.9 complete traversal, and compute a contrastive loss result for augmented sequence pairs generated by all the mashup services:

$$\mathcal{L}_{cl}^m = \sum_{m \in M} -\log \frac{\exp\left(\left(e_m^{aug1} \cdot e_m^{aug2}\right)/\tau\right)}{\sum_{m'!=m} \exp\left(\left(e_{m'}^{aug1} \cdot e_{m'}^{aug2}/\tau\right)\right)}$$

compute a contrastive loss result for augmented sequence pairs corresponding to all the APIs:

$$\mathcal{L}_{cl}^a = \sum_{a \in A} -\log \frac{\exp\left(\left(e_a^{aug1} \cdot e_a^{aug2}\right)/\tau\right)}{\sum_{a'!=a} \exp\left(\left(e_{a'}^{aug1} \cdot e_{a'}^{aug2}/\tau\right)\right)}$$

an overall loss result is as follows:

$$\mathcal{L}_{cl} = \mathcal{L}_{cl}^m + \mathcal{L}_{cl}^a$$

where τ is a temperature coefficient, and is configured to control discrimination of the model to negative samples to adjust generalization capability of the model, and log indicates a logarithmic function.

Step 7, compute pair-wise scores through the obtained feature representation, and compute an overall loss function result through the pair-wise scores and the data augmented sequence pairs to optimize parameters of an overall recommendation model. The process is as follows:

7.1 compute a pair-wise recommendation score between the mashup m and the candidate API α": $\hat{\gamma}_{m,α"} =$ $$fe_m^T$$

$fe_a$, where T indicates vector transpose;

7.2 for the mashup service m, optimize parameters through a pair-wise Bayesian personalized ranking loss (BPR) on the basis of service invocation information in training data, where APIs invoked by the mashup in a data set are called as a positive invocation example, which is defined as $X_m^+$, remaining candidate APIs are called as a negative invocation example $X_m^-$, and an overall loss function is computed as:

$$\mathcal{L}_{bpr} = \sum_{(m,a',b') \in O} -\ln\sigma\left(\hat{y}_{m,a'} - \hat{y}_{m,b'}\right)$$

where $O \in \{(m, α', b') | (m, α') \in X_m^+, (m, b') \in X_m^-\}$, and a' and b' indicate a positive API obtained by sampling and a negative API obtained by sampling respectively;

7.3 compute an overall loss result according to steps 6.9 and 7.2:

$$\mathcal{L} = \mathcal{L}_{bpr} + \theta \cdot \mathcal{L}_{cl}$$

where θ is a hyper-parameter for controlling intensity of contrastive learning; and 7.4 cycle the overall model from steps 1 to 7, and optimize the overall model through the loss function in step 7.3 to fit the data set by model parameters.

Step 8, match a user request, sort the pair-wise scores and complete service recommendation.

8.1 convert the user request for constructing a new combined service into a vector representation through a language model, such as bidirectional encoder representation from transformers (BERT) and word to vector (Word2vec), match the similarity between the vector representation and mashup service function description in an existing data set, and use q objects having the highest similarity in the vector representation as associated mashup services, which are represented as relationM={$rm_1$, $rm_2$, . . . , $rm_q$};

8.2 carry out mean-pooling operation on representations $$e_m^l$$

corresponding to mashup services in the set relationM to construct a feature representation $e_{newR}$ corresponding to the user request, where mean-pooling is common pooling operation; and averaging dimensions of the feature vector to obtain a new feature vector;

8.3 transmit $e_{newR}$ into a recommendation model optimized through step 6 to output a corresponding feature representation result $$e_{newR}^l$$

;

8.4 traverse candidate APIs, set APIs traversed currently as α, compute corresponding pair-wise recommendation scores $\hat{\gamma}_{newR}$,a according to the method in step 7.1, and form, by all the pair-wise recommendation scores, a set $Y_{newR}$; and 8.5 sort $Y_{newR}$ from large to small, and output top k APIs to complete API service recommendation for the new combined request.

The actual effect of the invention is analyzed below according to specific service data.

1) A mashup combination and an API data set are selected. Contents included in the data set are specifically shown in Table 1. 1423 mashups and 1032 candidate APIs having invocation relations with the mashups are included. Corresponding function description documents and corresponding tags are collected for each mashup and each API, and the description information is pre-segmented, and is converted into dense vectors through a BERT pre-training language model.

TABLE 1

| Item | Mashups | APIs |
|---|---|---|
| Number of elements | 1423 | 1032 |
| Number of tags | 297 | 301 |
| Document vector dimension | 768 | 768 |

2) All the services are divided into 5 parts through 20% of the number of the mashup services by using a cross-validation method, and one part of services is validated as a test set each time.

3) The effect of service recommendation is evaluated with multiple indexes: Hit rate (HR):

$$HR = \frac{|RecA_m \cap ObsA_m|}{|ObsA_m|}$$

where $RecA_m$ indicates a recommended API list for a mashup m, and $ObsA_m$ indicates an observable API invocation list of mbased on real data. Normalized discounted cumulative gain (NDCG) index:

$$NDCG = \frac{DCG}{IDCG}, DCG = \sum_n^N \frac{2^{r(n)} - 1}{\log_2(n+1)}, r(n) = \begin{cases} 1, & \text{if } n \text{ is relevant} \\ 0, & \text{if } n \text{ is irrelevant} \end{cases}$$

where N indicates the number of recommended services, n indicates services at a n-th position in order in a recommendation list, and an idea discounted cumulative gain (IDCG) is the sum of discounted cumulative gain (DCG) values obtained from all recommendation results. Mean average precision (MAP):

$$MAP = \frac{1}{|M|} \sum_{m=1}^{|M|} \frac{1}{num_m} \sum_{t=1}^{num_m} P(t) \cdot r(t),$$

$$P(t) = \frac{hit \ num \ before \ position \ t}{t}$$

where $num_m$ indicates the number of APIs invoked by the mashup m·P(t) computes a recommendation service ratio of successful hits before a current position t in the recommendation list.

Figures 2, 3:
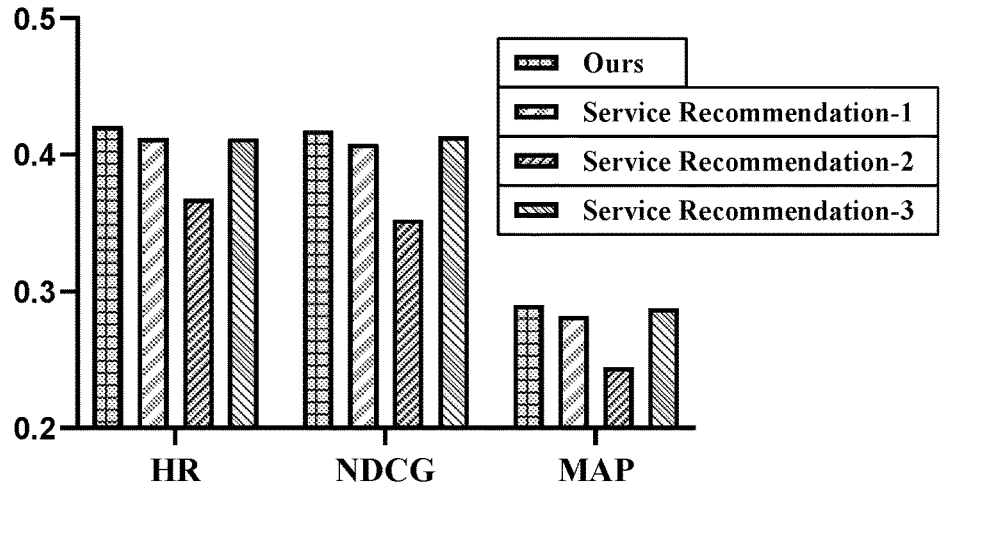
FIG. 2 is an effect diagram of a service recommendation model under changes of various parameters, where (a) shows a change trend of results of recommendation indexes along with changes of dimensions of an embedding representation; (b) shows a change trend of results of recommendation indexes along with changes of the number of graph propagation layers; (c) shows a change trend of results of recommendation indexes along with changes of probability parameters $\gamma$ and $\varepsilon$ in a data augmentation method; and (d) shows a change trend of results of recommendation indexes along with changes of intensity of contrastive learning.
FIG. 3 is a graph of a result of an ablation experiment of a service recommendation model.

4) A parameter experiment related to a service recommendation model is designed. Main parameters affecting the effect of the model include embedding representation dimensions, the number of graph information propagation layers, data augmentation probability, and contrastive learning intensity parameters in a loss function. FIG. 2 shows an effect diagram of a service recommendation model under various parameter changes; and (a) of FIG. 2 shows a change trend of results of recommendation indexes along with changes of embedding representation dimensions. Vectors may not accurately represent feature information of each service and may reduce the representation learning capability of the model due to the too small embedding representation dimensions. Therefore, the effect is poor. Along with increase in the embedding representation dimensions, the model training result is gradually improved; and when a value is 64, the model may balance representation and generalization capabilities, and achieve excellent results.

(b) of FIG. 2 shows a trend of results of recommendation indexes along with changes of the number of graph propagation layers. Changes of index results caused by changes of the number of graph propagation layers are observed. It may be seen that along with increase in the number of layers, the model effect is improved and reaches a peak at a value of 3 layers. Along with increase in the number of subsequent layers, effect changes tend to be gentle, but are not significantly reduced, which indicates that the mutual attention mechanism designed by the present invention may effectively fuse output of a multi-layer structure and learn useful information in a multi-layer invocation relation.

(c) of FIG. 2 shows a change trend of results of recommendation indexes along with changes of probability parameters $\gamma$ and $\varepsilon$ in a data augmentation method. Along with increase in values of the probability parameters, the model effect is gradually improved. When the value is around 0.6, as the value increases, the indicator results of model training remain basically stable. (d) of FIG. 2 shows a change trend of results of recommendation indexes along with changes of intensity of contrastive learning. The larger $\theta$ is, the greater contrastive intensity is. Before $\theta$ reaches a certain threshold, the effect of the service recommendation model is improved.

5) An ablation experiment related to the structure of the service recommendation model is designed. The function of each part of structure of the service recommendation model provided in the present invention is evaluated by providing three variations of the service recommendation model provided in the present invention. Service recommendation-1 is a model having no CAFG structure, has no additional information of the APIs, but retains feature vectors corresponding to service function description of the APIs. Service recommendation-2 is a model having no graph information propagation mechanism, and is a 0-layer structure without mutual learning of a service invocation structure. Service recommendation-3 is a model having no gate connection mechanism, which directly uses API representation output of the SIMG. FIG. 3 shows results of variant models on different experimental indexes.

The service recommendation-1 that loses additional information between APIs included in the CAFG, has a lower effect than a complete model, and especially has a significant decrease in the last two indexes related to a recommendation order. Training results of service recommendation-2 are observed, and has performance in various indexes significantly decreased after an information propagation process based on a graph neural network is eliminated. According to experimental results of service recommendation-3, results obtained without a gate mechanism are worse than those obtained by connecting two feature representations by using the gate mechanism. The results indicate that structural design of the service recommendation model is effective, thereby improving the effect of service recommendation.

Figure 4:
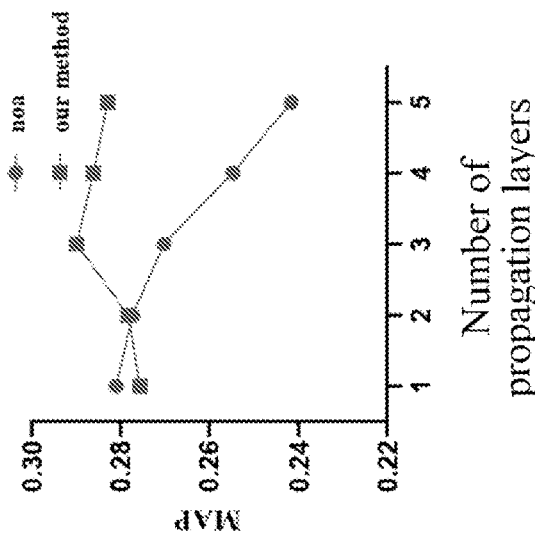
FIG. 4 is a graph of a result of an ablation experiment of a mutual attention mechanism.
Figure 4:
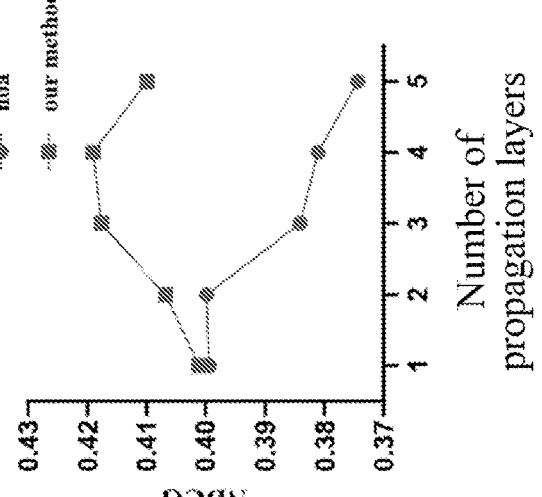
Figure 4:
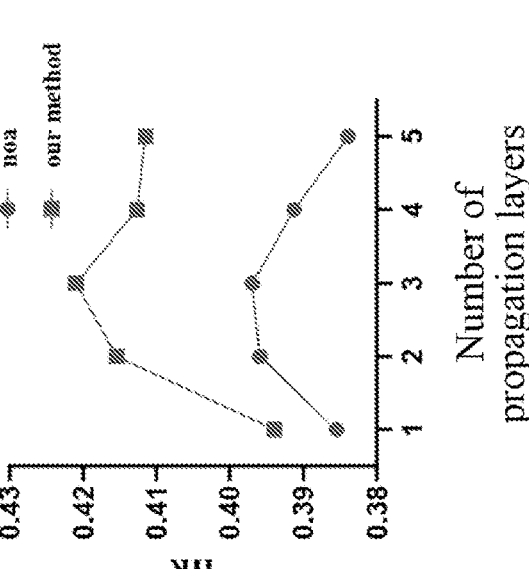

6) Model training results that use a mutual attention mechanism for multi-layer output integration are compared with results that do not use the mutual attention mechanism, so as to determine the function of the mutual attention mechanism. FIG. 4 shows changes of model training results on various indexes caused by two multi-layer output strategies in the case of the number of graph propagation layers is changed. Noa indicates removal of the mutual attention mechanism, and directly uses a method for multi-layer connection. From the change trend of recommended index results, it may be seen that the model effect may also be improved to some extent by utilizing additional information output from the multi-layer structure when the total number of layers is low in a simple strategy of connecting multi-layer results for output. Along with increase in the number of structural layers, the model effect may be reduced due to incapability to select multi-layer output results. The mutual attention mechanism may better generalize the output results of the multiple layers and fuse the multi-layer invocation relations between services into feature representations. As shown in the figure, the model may still maintain excellent recommendation effect in multi-layer situations, and various recommendation result indexes are not significantly reduced. Use of the mutual attention mechanism can better fuse the multi-layer output results, overcome interference caused by missing invocation information, and improve the effect of recommendation results.

The content in the examples of the description is only a listing of the implementation forms of the invention concept and is only for illustrative purposes. The scope of protection of the present invention should not be considered as limitations to the specific form stated in the examples, and the scope of protection of the present invention also extends to equivalent technical means conceivable by those of ordinary skill in the art according to the concept of the present invention.

What is claimed is:

1. A cloud-native application programming interface (API) recommendation method fusing data augmentation and contrastive learning, comprising:

step 1, on the basis of service invocation matrix information and function association information between APIs, constructing an invocation graph structure, service invocation matrix graph (SIMG), between mashup services and API services and an invocation graph structure, connecting API functional graph (CAFG) between the APIs to form a double-graph structure;

step 2, according to the invocation graph structure SIMG, designing a multi-layer graph propagation network structure to learn mashup feature representations and API feature representations;

step 3, according to the invocation graph structure CAFG, designing a corresponding graph neural network structure to compute feature representations corresponding to the APIs under the corresponding graph neural network structure;

step 4, designing a mutual attention mechanism layer to retain multi-layer output information, and computing attention weights of multi-layer output and merging feature representations of the mashup services by taking association information of the APIs as importance guidance;

step 5, carrying out weighted combination on the API feature representations of double graphs through a gate mechanism to generate a new API feature representation;

step 6, computing training similarity and prior information similarity between services, wherein a similarity computation result is a dot product of embedding vectors of two APIs or mashup services, and generating data augmented sequence pairs through a data augmentation method;

step 7, computing pair-wise scores through the obtained feature representation, and computing an overall loss function result through the pair-wise scores and the data augmented sequence pairs to optimize parameters of an overall recommendation model; and step 8, matching a user request, sorting the pair-wise scores and completing service recommendation.

2. The cloud-native API recommendation method fusing data augmentation and contrastive learning according to claim 1, wherein step 1 comprises:

step 1.1 representing the mashup services in a mashup service set M as a mashup type of graph nodes, representing the APIs in an API set A as an API type of the graph nodes, and representing an overall graph node set $V_{m\alpha}$;

step 1.2 setting an empty set $\varepsilon_{m\alpha}$ as a storage set of side information in the invocation graph structure regarding SIMG;

step 1.3 traversing the mashup services in the mashup service set M, setting a single mashup service m traversed currently, and obtaining an API set $m_{invoke}$ invoked by the mashup service set M from an invocation interaction matrix MA between the mashups and the APIs, wherein the invocation interaction matrix MA has a size of $|M|\times|A|$, wherein $|M|$ indicates the number of elements in the mashup service set M, and $|A|$ indicates the number of elements in the API set A;

step 1.4 traversing the API set $m_{invoke}$ obtained in step 1.3, setting the APIs a traversed currently, and with when a value corresponding to a corresponding position [m, α] in the invocation interaction matrix MA is 1, which indicates that an invocation relation exists between the single mashup service m and the APIs α, storing a side combination (m, α) into the empty set $\varepsilon_{m\alpha}$, which indicates that an undirected connection side exists between the graph nodes corresponding to m and α;

step 1.5 completing traversal, and combining the overall graph node set $V_{m\alpha}$ and the empty set $\varepsilon_{m\alpha}$ to complete construction of a graph structure SIMG(($V_{m\alpha}$, $\varepsilon_{m\alpha}$);

step 1.6 converting the API set A into a graph node set $V_{\alpha}$;

step 1.7 setting a side information set $\varepsilon_{\alpha}$ as a storage set of side information in the graph structure CAFG;

step 1.8 traversing the APIs α in the API set A, setting a single API $\alpha_1$ traversed currently, on this basis, traversing the APIs α in the API set A apart from the single API $\alpha_1$, and setting a single API $\alpha_2$ traversed currently;

step 1.9 with a tag information set $A^{tag}$ of the APIs α comprising tags corresponding to the APIs α, setting a tag set $$A_{a1}^{tag}$$

corresponding to the single API $\alpha_1$, setting a tag set $$A_{a2}^{tag}$$

corresponding to the single API α2 and when $$A_{a1}^{tag}$$

∩

$$A_{a2}^{tag}$$

is not the empty set $\varepsilon_{m\alpha}$ storing a side combination ($\alpha_1$, $\alpha_2$) into the side information set $\varepsilon_{\alpha}$, which indicates that an undirected connection side exists between graph nodes corresponding to the single API $\alpha_1$ and the single API $\alpha_2$; and step 1.10 completing traversal, and combining the graph node set $V_{\alpha}$ and the side information set $\varepsilon_{\alpha}$ to complete construction of a graph structure CAFG($V_{\alpha}$, $\varepsilon_{\alpha}$).

3. The cloud-native API recommendation method fusing data augmentation and contrastive learning according to claim 2, wherein the step 2 comprises:

step 2.1 constructing an embedding layer to store embedding vector information of the mashup services and API nodes in forms of:

$$E_{mashup} = \{e_{m_1}, e_{m_2}, \dots, e_{m_{|M|}}\}$$

$$E_a = \{e_{a_1}, e_{a_2}, \dots, e_{a_{|A|}}\}$$

$$E = \begin{bmatrix} E_{mashup} \\ E_a \end{bmatrix}$$

wherein $E_{mashup}$ indicates embedding representations corresponding to the mashup services, and $E_{\alpha}$ indicates embedding representations corresponding to the APIs; and combining $E_{mashup}$ and $E_{\alpha}$ to obtain an embedding layer embedding matrix E;

step 2.2 computing an adjacency matrix $I_{m\alpha}$ of the graph structure SIMG as the followings:

$$I_{ma} = \begin{bmatrix} 0 & MA \\ MA^T & 0 \end{bmatrix}$$

wherein MA is the service invocation interaction matrix, and the adjacency matrix $I_{m\alpha}$ has a size of $(|M|+|A|)\times(|M|+|A|)$, and comprises connection information of nodes in the invocation graph structure SIMG, wherein T indicates matrix transpose operation;

step 2.3 defining a degree $d^m$ corresponding to the mashup service m and a degree $d^{\alpha}$ of the API node corresponding to the API α, combining degree information corresponding to the mashup service m and the API α into a degree matrix $D_{m\alpha}$, and computing a normalized matrix $\tilde{I}_{m\alpha}$ of the adjacency matrix $I_{m\alpha}$:

$$\tilde{I}_{ma} = D_{ma}^{-\frac{1}{2}} I_{ma} D_{ma}^{-\frac{1}{2}}$$

wherein an element corresponding to a position (i, j) in the normalized matrix $\tilde{I}_{m\alpha}$ has a value of $$\frac{1}{\sqrt{|d_i^m||d_j^a|}},$$

wherein a size $$d_i^m$$

of the degree $d^m$ corresponding to the mashup service m having a sequence number of i, and a size $$d_j^a$$

of the degree $d^{\alpha}$ corresponding to the API node having a sequence number of j;

step 2.4 traversing node information in the invocation graph structure SIMG, setting nodes ν traversed currently comprising a mashup type of the graph nodes and an API type of the graph nodes, setting a neighbor node set $N^v$ of the nodes $v$ in the invocation graph structure SIMG, wherein the neighbor node set $N^v$ of $v$ having a side connection with the nodes, and computing a propagation result of each of a neighbor node $v_t \in N^v$:

$$h^l_{v \leftarrow v_t} = \frac{1}{\sqrt{|d_v||d_{v_t}|}} \left( W^{l1} e_v + W^{l2} \left( e_v \otimes e_{v_t} \right) \right)$$

wherein l indicates the number of layers of a graph propagation structure of a multi-layer graph neural network, $W^{l1}$ and $W^{l2}$ are both trainable parameter matrixes of a current layer, $\otimes$ indicates multiplication operation of vector elements, $e_v$ indicates an embedding representation corresponding to the node $v$, and $e_{v_t}$ indicates an embedding representation of the neighbor node $v_t$ of the node $v$;

step 2.5 aggregating propagation information of the node $v$ and the neighbor node $v_t$ of the node $v$ to form node feature embedding output of the current layer:

$$e^l_v = \sigma \left( e^{l-1}_v + \sum_{v_t \in N^v} h^l_{v \leftarrow v_t} \right)$$

wherein $\sigma$ is an activation function, $$e^{l-1}_v$$

indicates node embedding output of a previous layer, and $\Sigma$ indicates vector summation operation; and step 2.6 according to properties of the node $v$, dividing an output node embedding result into a mashup service feature representation $$e^l_m$$

and an API feature representation $$e^l_a$$

for output.

4. The cloud-native API recommendation method fusing data augmentation and contrastive learning according to claim 3, wherein the step 3 comprises:

step 3.1 with one-hot representation being a vectorized representation method, wherein each feature is represented by an independent binary dimension, only one dimension has a value of 1, and remaining dimensions all have a value of 0, and the dimensions are configured to represent categorical variables or discrete variables, constructing an API embedding representation based on one-hot representation, and converting, by the API embedding representation based on one-hot representation, high-dimensional one-hot representation corresponding to the API set into a dense embedding representation AOE$\in R^{|A| \times d}$ through an embedding layer, wherein d is a dimension of the embedding representation;

step 3.2 obtaining an adjacency matrix $I_\alpha \in R^{|A| \times |A|}$ of the invocation graph structure CAFG, wherein when the adjacency matrix $I_\alpha[u, w]=1$, it is indicated that the API $\alpha_u$ having a sequence number of u and the API $\alpha_w$ having a sequence number of w share the same tag information;

step 3.3 computing a corresponding degree matrix $D_\alpha \in R^{|A| \times |A|}$, wherein the corresponding degree matrix $D_\alpha$ is a diagonal matrix, wherein $D_\alpha[u, u]$ indicates the total number of the APIs having the same tag as $\alpha_u$;

step 3.4 computing a normalized adjacency matrix $$\hat{I}_a = D_a^{-\frac{1}{2}} I_a D_a^{-\frac{1}{2}}$$

as a convolution weight of an input vector set; and step 3.5 carrying out graph convolution computation on the embedding representation through the normalized adjacency matrix $\hat{I}_\alpha$:

$$L^1 = \sigma \left( \hat{I}_a P W^5 \right)$$

$$C = L^2 = \sigma \left( \hat{I}_a L^1 W^6 \right)$$

wherein $\sigma$ indicates an activation function, $W^5 \in R^{d \times d}$ and $W^6 \in R^{d \times d}$ are weights of two layers respectively, computed output C is used as API feature representation output under the network structure, and has a size of the output $C \in R^{|A| \times d}$, and a feature representation corresponding to the service $\alpha$ is defined as $c_\alpha$.

5. The cloud-native API recommendation method fusing data augmentation and contrastive learning according to claim 4, wherein the step 4 comprises:

step 4.1 representing a matrix $$E^l_m$$

consisting of all feature representation vectors of the mashup services of l-th layer output obtained in step 2.6, representing a matrix $$E^l_a$$

consisting of feature representation vectors corresponding to the APIs, and combining output of a current propagation layer:

$$E^l_q = \begin{bmatrix} E^l_m \\ E^l_a \end{bmatrix}$$

step 4.2 combining the matrix $$E^l_m$$

and a feature matrix C output a matrix $$E^l_{key}$$

from step 3.5:

$$E^l_{key} = \begin{bmatrix} E^l_m \\ C \end{bmatrix}$$

step 4.3 with the attention mechanism being a common method in machine learning, and being configured to assign weights to different elements in a sequence comprising a query part and a key part, computing similarity between the query and the key to carry out weighted summation on the elements, so as to achieve feature extraction and weighted fusion of the sequence, and designing the mutual attention mechanism to connect the feature representations of the mashup services output by the multi-layer structure, and computing a query representation $q_l$ of the mutual attention mechanism:

$$q_l = W^{ql} E^l_q$$

wherein $W^{ql} \in R^{d+(|M|+|A|)}$ is a trainable weight parameter, and the query representation $q_1$ is used as an attention query corresponding to an output result of a l-th propagation layer;

step 4.4 computing a key representation $k_l$ of the mutual attention mechanism:

$$k_l = W^k E^l_{key}$$

wherein $W^k \in R^{d*(|M|+|A|)}$ is a trainable weight parameter, and the key representation $k_l$ indicates an attention key corresponding to an output result of the l-th propagation layer;

step 4.5 computing mutual attention weight information corresponding to the l-th layer:

$$\gamma'_l = \frac{q^T_l k_l}{\sqrt{d}}, \alpha_l = \frac{\exp(\gamma'_l)}{\sum^L_{l'=1} \exp(\gamma'_{l'})},$$

wherein exp( ) indicates exponential power by using a natural constant e as a base, L is the total number of graph propagation layers, and T indicates vector transpose; and step 4.6 weighing output of graph propagation layers:

$$aE^l_m = E^l_m \otimes \alpha_l$$

wherein $\otimes$ is operation of computing product of each element, and $$aE^l_m$$

indicates a weighted result of feature vectors of l-th layer output; and then connecting weighted output of the layers, and converting the weighted output into a final mashup feature representation:

$$FE_m = f_{cm}(aE^1_m \oplus aE^2_m \oplus \dots \oplus aE^l_m)$$

wherein $\oplus$ indicates vector connection operation, $f_{cm}$ indicates a multi-layer perceptron having an input size of L*d and output of d, and the multi-layer perceptron is a model based on a neural network, and consists of a plurality of fully-connected hidden layers and output layers; and setting a mashup feature vector result $fe_m$ corresponding to the mashup service m in the matrix $FE_m$.

6. The cloud-native API recommendation method fusing data augmentation and contrastive learning according to claim 1, wherein the step 5 comprises:
step 5.1 computing, by the API feature representation $$e^l_a$$

output by the corresponding graph neural network structure based on the invocation graph structure SIMG and the API feature representation $$e^l_a$$

output by the corresponding graph neural network structure based on the invocation graph structure CAFG, a gate weight β corresponding to the gate mechanism:

$$\beta = \sigma(W^g(C \oplus E^l_a))$$

wherein $W^g$ is a trainable weight, and $$E^l_a$$

indicates a set of the API feature representation $$e^l_a$$

corresponding to all the services; and
step 5.2 with the weight for connection, computing a final output result:

$$FE_a = \beta * C + (1 - \beta) * E^l_a$$

wherein $FE_\alpha$ is a matrix consisting of all the API feature representations obtained by weighting feature representations in a form of a matrix; and setting a feature vector result $fe_\alpha$ corresponding to the API $\alpha$ in the matrix $FE_\alpha$.

7. The cloud-native API recommendation method fusing data augmentation and contrastive learning according to claim 1, wherein the step 6 comprises:

step 6.1 computing the training similarity between the services, and using dot product of embedding vectors of two APIs or mashup services as a similarity computation result:

$$Sim_{train}^{api}(a_1, a_2) = fe_{a_1} \cdot fe_{a_2}$$

$$Sim_{train}^{mashup}(m_1, m_2) = fe_{m_1} \cdot fe_{m_2}$$

wherein $\alpha_1$, $\alpha_2$ indicate any two different APIs, $$Sim_{train}^{api}$$

$(a_1, a_2)$ indicates the training similarity between the APIs $\alpha_1$ and $\alpha_2$, $m_1$, $m_2$ indicates any two different mashup services, and $$Sim_{train}^{mashup}$$

$(m_1, m_2)$ indicates the training similarity between the mashups $m_1$ and $m_2$; and step 6.2 computing the prior information similarity between the services, and computing similarity between service description documents on the basis of similarity computation of the service description documents and service function tags:

$$Sim_{description}^{api}(a_1, a_2) = \cos(e_{a_1}^{lm}, e_{a_2}^{lm}) = \frac{e_{a_1}^{lm T} e_{a_2}^{lm}}{\|e_{a_1}^{lm}\|\|e_{a_2}^{lm}\|}$$

$$Sim_{description}^{mashup}(m_1, m_2) = \cos(e_{m_1}^{lm}, e_{m_2}^{lm}) = \frac{e_{m_1}^{lm T} e_{m_2}^{lm}}{\|e_{m_1}^{lm}\|\|e_{m_2}^{lm}\|}$$

wherein cos( ) indicates cosine similarity, $$e_a^{lm}$$

indicates a service function representation obtained by computation of a language model corresponding to the API $\alpha$, $$Sim_{description}^{api}$$

$(\alpha_1, \alpha_2)$ indicates the prior information similarity between the APIs $\alpha_1$ and $\alpha_2$, $\|$ $$e_a^{lm}$$

$\|$ indicates a modulus of a vector $$e_a^{lm}$$

, $$e_m^{lm}$$

indicates a service function representation obtained by computation of a language model corresponding to the mashup m, $$Sim_{description}^{mashup}$$

$(m_1, m_2)$ indicates the prior information similarity between the mashups $m_1$ and $m_2$, and $\|$ $$e_m^{lm}$$

$\|$ indicates a modulus of a vector $$e_m^{lm}$$

;

step 6.3 computing similarity between service tags:

$$Sim_{tag}^{api}(a_1, a_2) = \frac{|a_{tag}^1 \cap a_{tag}^2|}{|a_{tag}^1| + |a_{tag}^2| - |a_{tag}^1 \cap a_{tag}^2|}$$

$$Sim_{tag}^{mashup}(m_1, m_2) = \frac{|m_{tag}^1 \cap m_{tag}^2|}{|m_{tag}^1| + |m_{tag}^2| - |m_{tag}^1 \cap m_{tag}^2|}$$

wherein $m_{tag}$ indicates a function tag set of the mashup, $\alpha_{tag}$ indicates a tag set of the APIs, $|m_{tag}|$ indicates the number of mashup function tags, and $|m_{tag}|$ indicates the number of the API function tags;

step 6.4 using a larger result between function description similarity and tag similarity as prior information similarity between the services:

$$Sim_{info}^{api}(a_1, a_2) = \max(\widetilde{Sim}_{description}^{api}(a_1, a_2), \widetilde{Sim}_{tag}^{api}(a_1, a_2))$$

$$Sim_{info}^{mashup}(m_1, m_2) = \max(\widetilde{Sim}_{description}^{mashup}(m_1, m_2), \widetilde{Sim}_{tag}^{mashup}(m_1, m_2))$$

wherein ($\widetilde{Sim}$) indicates a normalized similarity result;

step 6.5 using a larger result between the training similarity between the services and the prior information similarity as overall similarity information between the services:

$$Sim_a(a_1, a_2) = \max\left(\widetilde{Sim}_{train}^{api}(a_1, a_2), \widetilde{Sim}_{info}^{api}(a_1, a_2)\right)$$

$$Sim_m(m_1, m_2) = \max\left(\widetilde{Sim}_{train}^{mashup}(m_1, m_2), \widetilde{Sim}_{info}^{mashup}(m_1, m_2)\right)$$

computing similarity information between the services as a basis for data augmentation;

step 6.6 designing four service sequence data augmentation methods as follows:

(1) service cutting: for a service sequence $m\alpha_c=\{\alpha_1, \alpha_2, \ldots, \alpha|m\alpha_c|\}$, selecting a continuous subsequence having a length of $L_{sc}=\|\mu^*|m\alpha_c\|$ from a random position as an augmented sequence, wherein $\mu\in(0,1)$ is a random cutting parameter, wherein $|m\alpha_c|$ is the number of the APIs in the service invocation sequence;

(2) service occlusion: for a service sequence $m\alpha_c=\{\alpha_1, \alpha_2, \ldots, \alpha_{|m\alpha_c|}\}$, randomly discarding the APIs of the number being $L_{sm}=\|\eta^*|m\alpha_c\|$, wherein $\eta\in(0,1)$ is a random occlusion parameter, wherein $|m\alpha_c|$ is the number of the APIs in the service invocation sequence;

(3) association replacement: for a service invocation sequence $m\alpha_c=\{\alpha_1, \alpha_2, \ldots, \alpha_{|m\alpha_c|}\}$, randomly selecting an item $L_{rc}=\|\gamma^*|m\alpha_c\|$, and replacing the item with a service having high function correlation, wherein $\gamma\in(0,1)$ indicates a replacement probability parameter, and $|m\alpha_c|$ is the number of the APIs in the service invocation sequence;

(4) association expansion: for a service invocation sequence $m\alpha_c=\{\alpha_1, \alpha_2, \ldots, \alpha_{|m\alpha_c|}\}$, randomly selecting an item $L_{re}=\|\varepsilon^*|m\alpha_c\|$, and inserting a service having high function correlation with the item into a position in which the item is located, wherein $\varepsilon\in(0,1)$ indicates an expansion probability parameter, wherein $|m\alpha_c|$ is the number of the APIs in the service invocation sequence; and in the augmentation methods (3) and (4), determining service function correlation through similarity information between the services obtained in step 6.5, with respect to the association replacement method (3), for $L_{rc}$ services randomly selected, obtaining, through a similarity computation result between the services provided in step 6.5, services having the highest function similarity from candidate services, apart from services existing in an original sequence, as new services, so as to replace the services randomly selected, and with respect to the association expansion method (4), for $L_{re}$ services randomly selected, obtaining, through a similarity computation result between the services provided in step 6.5, services having the highest function similarity from candidate services, apart from services existing in an original sequence, as new services, and adding the new services after original positions in sequences in which the services randomly selected are located to complete sequence augmentation;

step 6.7 for the mashup service set M, traversing the mashup services in M, setting a single mashup service traversed currently as m, for the service invocation sequence $m\alpha_m$, corresponding to m, selecting two sequence data augmentation methods provided in step 6.6 to process the sequence to generate two newly augmented sequence results $\alpha sm1$ and $\alpha sm2$ respectively, for the API set A, traversing the APIs in A, setting a single API $\alpha$ traversed currently, setting a mashup sequence $\alpha m_\alpha$ that invoked the API, and selecting two sequence data augmentation methods provided in step 6.6 to process the sequence to generate two newly augmented sequence results $ms\alpha1$ and $ms\alpha2$ respectively;

step 6.8 obtaining API feature representations corresponding to all APIs in $\alpha sm1$ in an API feature representation matrix $FE_\alpha$, and carrying out mean-pooling processing on all the obtained feature representations as a representation result corresponding to the sequence $\alpha sm1$, which is set as $$e_m^{aug1}$$

; averaging dimensions of feature vectors to obtain a new feature vector, carrying out the same processing on $\alpha sm2$ to obtain a representation result, which is set as $$e_m^{aug2}$$

, obtaining mashup feature representations corresponding to all mashup services in $ms\alpha1$ in a mashup feature representation matrix $FE_m$, carrying out mean-pooling processing on all the obtained feature representations as a representation result $$e_a^{aug1}$$

corresponding to the sequence $ms\alpha1$, and carrying out the same processing on $ms\alpha2$ to obtain a representation result $$e_a^{aug2}$$

; and step 6.9 completing traversal, and computing a contrastive loss result $$\mathcal{L}_{cl}^m$$

for augmented sequence pairs generated by all the mashup services:

$$\mathcal{L}_{cl}^m = \sum_{m\in M} -\log\frac{\exp\left((e_m^{aug1}\cdot e_m^{aug2})/\tau\right)}{\sum_{m'!=m}\exp\left((e_{m'}^{aug1}\cdot e_{m'}^{aug2}/\tau\right)}$$

computing a contrastive loss result $$\mathcal{L}_{cl}^a$$

for augmented sequence pairs corresponding to all the APIs:

$$\mathcal{L}_{cl}^a = \sum_{a\in A} -\log\frac{\exp\left((e_m^{aug1}\cdot e_m^{aug2})/\tau\right)}{\sum_{a'!=a}\exp\left((e_{a'}^{aug1}\cdot e_{a'}^{aug2}/\tau\right)}$$

an overall loss result $\mathcal{L}_{cl}$ is as follows:

$$\mathcal{L}_{cl} = \mathcal{L}_{cl}^m + \mathcal{L}_{cl}^a$$

wherein $\tau$ is a temperature coefficient, and is configured to control discrimination of the model to negative samples to adjust generalization capability of the model, and log indicates a logarithmic function.

8. The cloud-native API recommendation method fusing data augmentation and contrastive learning according to claim 7, wherein in the step 6.7, a process of selecting the augmentation methods and generating the augmented sequence pairs comprises:

step 6.7.1 setting a set for storing combined data augmentation methods, which is set as $aug_{list}$ and is initially an empty set; and storing the four service sequence data augmentation methods in the step 6.6 into a set DA, setting the number of elements in the set as nd, and setting a count index as 1;

step 6.7.2 traversing DA, and setting a method object traversed currently as $d\alpha$;

step 6.7.3 for each traversal, assigning index+1 to target;

step 6.7.4 when target is less than nd, storing da into the set $aug_{list}$, storing augmentation methods having a sequence number of target in DA into the set $aug_{list}$, and adding 1 to target;

step 6.7.5 repeating steps 6.7.3 and 6.7.4 until target has a value greater than or equal to nd;

step 6.7.6 adding 1 to index;

step 6.7.7 ending traversal, and completing initialization of the set $aug_{list}$;

step 6.7.8 assigning 0 to a counter now, and setting a set for storing the augmented sequence pairs, which is set as ASP, and is initially an empty set;

step 6.7.9 traversing the API invocation sequence $m\alpha$ of the mashup, and storing the invocation sequences corresponding to all the mashups in the set mashup service M into the set, which are set as SM;

step 6.7.10 traversing the set SM, and setting a current traversal sequence sm;

step 6.7.11 obtaining data augmentation methods having a sequence number of now in the set $aug_{list}$ to process the current traversal sequence sm, and setting a generated augmented sequence as $\alpha sm1$;

step 6.7.12 adding 1 to now, and setting now as 0 when now has a size equal to nd;

step 6.7.13 obtaining data augmentation methods having a sequence number of now in $aug_{list}$ to process sm, and setting a generated augmented sequence as $\alpha sm2$;

step 6.7.14 adding 1 to now, and setting now to 0 when now has a size equal to nd;

step 6.7.15 storing pair-wise augmented sequence results ($\alpha sm1$, $\alpha sm2$) into an augmented sequence pair set ASP;

step 6.7.16 completing traversal of the set SM;

step 6.7.17 traversing a mashup invocation sequence am of the APIs, and storing invoked sequences corresponding to all APIs in the set A into the set, which are set as SA;

step 6.7.18 traversing the set SA, and setting a current traversal sequence $s\alpha$;

step 6.7.19 obtaining data augmentation methods having a sequence number of now in the set $aug_{list}$ to process $s\alpha$, and setting a generated augmented sequence as $ms\alpha1$;

step 6.7.20 adding 1 to now, and setting now as 0 when now has a size equal to nd;

step 6.7.21 obtaining data augmentation methods having a sequence number of now in the set $aug_{list}$ to process the current traversal sequence $s\alpha$, and setting a generated augmented sequence as $ms\alpha2$;

step 6.7.22 adding 1 to now, and setting now to 0 when now has a size equal to nd;

step 6.7.23 storing pair-wise augmented sequence results ($ms\alpha1$, $ms\alpha2$) into an augmented sequence pair set ASP; and step 6.7.24 completing traversal, and outputting a pair-wise augmented sequence result set ASP.

9. The cloud-native API recommendation method fusing data augmentation and contrastive learning according to claim 7, wherein the step 7 comprises:

step 7.1 computing a pair-wise recommendation score between the mashup service m and the candidate API $\alpha$":$\hat{\gamma}_{m,\alpha}$"=

$$fe_m^T$$

$fe_\alpha$, wherein T indicates vector transpose;

step 7.2 for the mashup service m, optimizing parameters through a pair-wise Bayesian personalized ranking loss (BPR) on the basis of service invocation information in training data, wherein the APIs invoked by the mashup in a data set are called as a positive invocation example $X_m^+$, remaining candidate APIs are called as a negative invocation example $X_m^-$, and an overall loss function $\mathcal{L}_{bpr}$ is computed as:

$$\mathcal{L}_{bpr} = \sum_{(m,a',b') \in O} -\ln\sigma(\hat{y}_{m,a'} - \hat{y}_{m,b'})$$

wherein $O \in \{(m, \alpha', b')|(m, \alpha') \in X_m^+, (m, b') \in X_m^-,\}$, and a' and b' indicate a positive API obtained by sampling and a negative API obtained by sampling respectively;

step 7.3 computing an overall loss result $\mathcal{L}$ according to steps 6.9 and 7.2:

$$\mathcal{L} = \mathcal{L}_{bpr} + \theta \cdot \mathcal{L}_{cl}$$

wherein $\theta$ is a hyper-parameter for controlling intensity of contrastive learning; and step 7.4 cycling the overall model from the steps 1 to 7, and optimizing the overall model through the loss function in the step 7.3 to fit the data set by model parameters.

10. The cloud-native API recommendation method fusing data augmentation and contrastive learning according to claim 1, wherein the step 8 comprises:

step 8.1 converting the user request for constructing a new combined service into a vector representation through a language model, matching the similarity between the vector representation and mashup service function description in an existing data set, and using q objects having the highest similarity in the vector representation as associated mashup services, which are represented as relationM={$rm_1$, $rm_2$, . . . , $rm_q$};

step 8.2 carrying out mean-pooling operation on representations $$e_m^l$$

5 corresponding to mashup services in the set relationM to construct a feature representation $e_{newR}$ corresponding to the user request, wherein mean-pooling is common pooling operation; and averaging dimensions of the feature vector to obtain a new feature vector;

10 step 8.3 transmitting $e_{newR}$ into a recommendation model optimized through the step 6 to output a corresponding feature representation result

15

$$e_{newR}^l$$

20

;

step 8.4 traversing candidate APIs, setting APIs traversed currently as $\alpha$, computing corresponding pair-wise recommendation scores $\gamma_{newR,\alpha}$ according to the method in step 7.1, and forming, by all the pair-wise recommendation scores, a set $Y_{newR}$; and

25 step 8.5 sorting $Y_{newR}$ from large to small, and outputting top k APIs to complete API service recommendation for the new combined request.

\* \* \* \* \*